United States Patent
Alptekin

(10) Patent No.: US 9,107,400 B1
(45) Date of Patent: Aug. 18, 2015

(54) MARINE ANIMAL DETERRENT APPARATUS AND RELATED METHODS

(75) Inventor: Ahmet Tuncer Alptekin, Newport Beach, CA (US)

(73) Assignee: SealStop, Inc., Santa Ana, CA (US)

( * ) Notice: Subject to any disclaimer, the term of this patent is extended or adjusted under 35 U.S.C. 154(b) by 0 days.

(21) Appl. No.: 12/721,518

(22) Filed: Mar. 10, 2010

(51) Int. Cl.
| | |
|---|---|
| A01M 29/30 | (2011.01) |
| E04B 1/72 | (2006.01) |
| A01M 23/10 | (2006.01) |
| E04D 13/00 | (2006.01) |
| A01K 15/04 | (2006.01) |
| A01M 99/00 | (2006.01) |

(52) U.S. Cl.
CPC ............... *A01M 29/30* (2013.01); *A01M 23/10* (2013.01); *A01K 15/04* (2013.01); *A01M 99/00* (2013.01); *E04D 13/004* (2013.01)

(58) Field of Classification Search
CPC ....... A01M 1/24; A01M 29/30; A01M 23/10; A01M 99/00; A01K 15/04
USPC ................ 52/101, 94, 84, 1, 573.1; 43/1, 124
See application file for complete search history.

(56) References Cited

U.S. PATENT DOCUMENTS

| | | | | |
|---|---|---|---|---|
| 1,380,325 | A | * | 5/1921 | Schlirf .......................... 446/218 |
| 2,270,537 | A | * | 1/1942 | Ludington ................... 52/173.1 |
| 2,575,252 | A | * | 11/1951 | Berger ............................ 40/417 |
| 2,777,171 | A | | 1/1957 | Burnside et al. |
| 3,191,239 | A | * | 6/1965 | Moore et al. ..................... 52/101 |
| 3,435,550 | A | * | 4/1969 | Carlson ............................... 43/3 |

(Continued)

FOREIGN PATENT DOCUMENTS

| | | |
|---|---|---|
| DE | 102007021152 A1 | * 11/2008 |
| DE | 102006033377 B4 | * 9/2010 |

(Continued)

OTHER PUBLICATIONS

Machine Translation of DE102007021152 A1 retrieved from Espacenet.com on May 27, 2014 (6 pages).*

(Continued)

*Primary Examiner* — Rodney Mintz
(74) *Attorney, Agent, or Firm* — Morrison & Foerster LLP

(57) ABSTRACT

Apparatus and methods are disclosed for deterring marine animals such as seals and other marine-dwelling animals from mounting or hauling out onto a marine vessel or structure. In one embodiment, the device comprises a base support member for attachment of the device to a structure to be protected. The base support member includes a stand-off block member and associated irritating, non-fixed/rotating element attached thereto. When large animals such as seals mount on a structure where the deterrent device is installed, the preferably blunted corners of the rotating element cause discomfort to the animal by creating pressure points on the skin or blubber of the animal as they brush by or step on the device. The non-fixed/rotating element preferably can turn or otherwise release the animal as it moves away from the discomfort. Thus, the invention preferably irritates these nuisance animals sufficiently to make them move from that area, while minimizing or eliminating the risk of harm to the animal. Methods are disclosed for deterring animals from getting into and/or staying in selected/protected areas, as well as other methods such as ways of attaching the device to surface to be protected in order to deter animals from getting onto that surface.

21 Claims, 32 Drawing Sheets

(56) References Cited

U.S. PATENT DOCUMENTS

| | | | |
|---|---|---|---|
| 3,517,912 A * | 6/1970 | Foley | 256/1 |
| 3,753,553 A * | 8/1973 | Bockting | 256/1 |
| 3,786,583 A * | 1/1974 | Revor | 40/479 |
| 3,799,105 A * | 3/1974 | Porter | 116/22 A |
| 4,184,840 A * | 1/1980 | Gamberg et al. | 432/253 |
| 4,269,008 A * | 5/1981 | Assouline | 52/101 |
| 4,404,778 A | 9/1983 | Ushimaru | |
| 4,748,778 A * | 6/1988 | Rafter, Sr. | 52/101 |
| 4,815,235 A * | 3/1989 | Faltinowski | 52/101 |
| 4,841,914 A * | 6/1989 | Chattan | 52/101 |
| 4,922,468 A | 5/1990 | Menezes | |
| 4,962,619 A * | 10/1990 | Chatten | 52/101 |
| 5,003,734 A * | 4/1991 | Dinsmore | 52/101 |
| 5,062,612 A * | 11/1991 | Mincher | 256/11 |
| 5,167,099 A * | 12/1992 | Nelson | 52/101 |
| 5,253,444 A * | 10/1993 | Donoho et al. | 43/1 |
| 5,259,695 A * | 11/1993 | Mostkoff | 405/29 |
| 5,343,651 A * | 9/1994 | Chatten | 43/1 |
| 5,400,552 A | 3/1995 | Negre | |
| 5,433,029 A | 7/1995 | Donoho et al. | |
| 5,452,536 A * | 9/1995 | Chatten | 43/1 |
| 5,596,834 A | 1/1997 | Ritter | |
| 5,610,876 A | 3/1997 | Jeffers | |
| 5,615,429 A * | 4/1997 | Williams | 5/509.1 |
| 5,615,524 A | 4/1997 | Costa | |
| 5,784,980 A | 7/1998 | Benefiel | |
| 5,895,304 A * | 4/1999 | Dixon | 446/70 |
| 6,109,029 A | 8/2000 | Vowles et al. | |
| 6,176,047 B1 * | 1/2001 | Morningstar | 52/101 |
| 6,226,933 B1 | 5/2001 | Nelson et al. | |
| 6,250,023 B1 * | 6/2001 | Donoho | 52/101 |
| 6,250,255 B1 | 6/2001 | Lenhardt et al. | |
| 6,264,522 B1 * | 7/2001 | Dickson | 446/120 |
| 6,283,064 B1 * | 9/2001 | Djukastein et al. | 119/713 |
| 6,314,688 B1 | 11/2001 | Ford et al. | |
| 6,363,637 B1 * | 4/2002 | Birmingham | 40/440 |
| 6,457,283 B1 * | 10/2002 | Jensen | 52/101 |
| 6,514,010 B2 * | 2/2003 | Dreyer | 405/63 |
| 6,519,901 B1 | 2/2003 | Nelson | |
| 6,557,482 B1 * | 5/2003 | Doty et al. | 116/22 A |
| 6,571,517 B2 * | 6/2003 | Wulff et al. | 52/101 |
| 6,735,901 B1 * | 5/2004 | Bellehumeur | 43/132.1 |
| 6,775,950 B2 * | 8/2004 | Donoho | 52/101 |
| 6,814,021 B1 * | 11/2004 | Turkewitz et al. | 116/22 A |
| 6,941,886 B1 * | 9/2005 | Suelzer | 114/343 |
| 6,999,379 B2 | 2/2006 | Nadeau | |
| D546,410 S * | 7/2007 | Wiesener et al. | D22/120 |
| 7,549,248 B1 * | 6/2009 | Luster | 43/2 |
| 7,930,989 B2 * | 4/2011 | Doty et al. | 116/22 A |
| 8,347,811 B2 * | 1/2013 | Bucci | 118/500 |
| 8,438,998 B2 * | 5/2013 | Spencer | 119/713 |
| 8,579,546 B2 * | 11/2013 | Masters et al. | 405/216 |
| 8,915,026 B2 * | 12/2014 | Myers | 52/101 |
| 2001/0017012 A1 * | 8/2001 | Wiesener et al. | 52/101 |
| 2003/0009957 A1 * | 1/2003 | Wulff et al. | 52/101 |
| 2004/0216393 A1 * | 11/2004 | Hall et al. | 52/79.1 |
| 2007/0074467 A1 | 4/2007 | Zecher | |
| 2007/0193135 A1 * | 8/2007 | VandenBerg | 52/198 |
| 2008/0131210 A1 * | 6/2008 | Wajnikonis | 405/211 |
| 2009/0133612 A1 * | 5/2009 | Wajnikonis | 114/199 |
| 2009/0283035 A1 * | 11/2009 | Bucci | 118/500 |
| 2010/0215440 A1 * | 8/2010 | Wajnikonis | 405/211 |
| 2010/0263303 A1 * | 10/2010 | Kiserman | 52/101 |
| 2012/0211711 A1 * | 8/2012 | Dahlhaug | 256/14 |
| 2013/0058000 A1 * | 3/2013 | Kaps et al. | 361/232 |
| 2014/0059948 A1 * | 3/2014 | Myers | 52/101 |
| 2014/0224171 A1 * | 8/2014 | Donoho | 116/22 A |

FOREIGN PATENT DOCUMENTS

| | | | |
|---|---|---|---|
| EP | 0271016 B1 * | 5/1991 | |
| FR | 2885486 A1 * | 11/2006 | |
| GB | 864298 A * | 3/1961 | |
| GB | 2260252 A * | 4/1993 | |
| GB | 2421167 A * | 6/2006 | |
| GB | 2448528 | 10/2008 | |
| GB | 2462339 A * | 2/2010 | |
| JP | 2005095062 A * | 4/2005 | |
| JP | 2005270074 A * | 10/2005 | |
| JP | 2005295909 A * | 10/2005 | |
| JP | 2011205957 A * | 10/2011 | |
| WO | WO 0078137 A1 * | 12/2000 | |
| WO | WO 2008/129313 A1 | 10/2008 | |

OTHER PUBLICATIONS

Machine Translation of JP 2005-295909 A (6 pages), retrieved from JPO on Dec. 6, 2012.*

Photograph of Deterrent Device Known to Applicant, taken on or before Mar. 10, 2010.

* cited by examiner

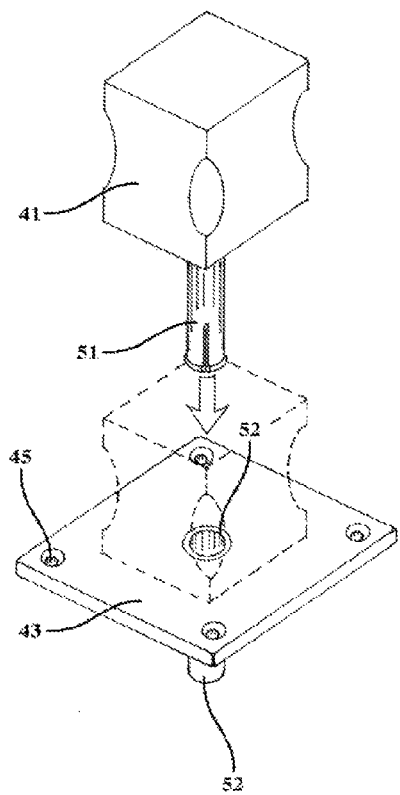
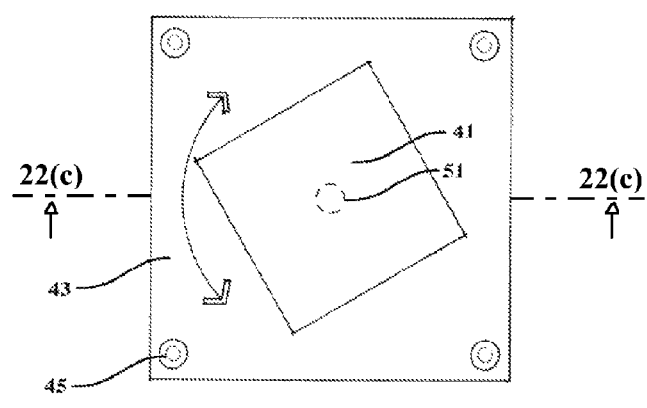
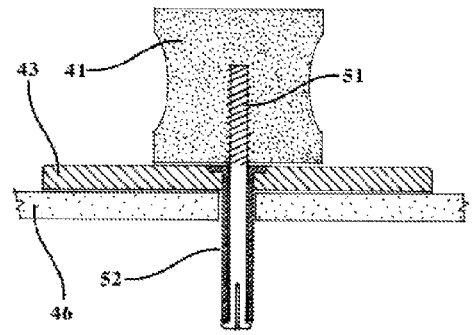
Fig. 22(a)
Fig. 22(b)
Fig. 22(c)

MARINE ANIMAL DETERRENT APPARATUS AND RELATED METHODS

FIELD OF THE INVENTION

The present invention relates generally to a deterrent device, and more particularly to a deterrent device for deterring marine-dwelling animals such as seals and other pinnipeds from hauling out, mounting, or occupying space on a marine structure such as the deck or other part of a vessel, dock, pier, sea wall, swim step, deck, developed waterfront and the like.

BACKGROUND OF THE INVENTION

Structures that are nearby to aquatic environments (such as docks, piers, floats, decks, developed waterfronts, break waters, sea walls and the like, as well as decks, hulls, swim steps, cockpits, platforms and gunwales of marine vessels, by way of example and not by way of limitation) are prone to haul-outs by marine dwelling animals such as seals, sea lions, and other animals. When these animals successfully get onto these structures, they typically cause a damage to the structure or adjacent property, create potentially dangerous situations for humans and other animals, interfere with the owner's desired use of the structure/thing, and generally are a nuisance to humans and the surrounding environment.

The National Oceanic and Atmospheric Administration (NOAA) has published suggested deterrents and potential methods by which private property owners may try to deter seals, seal lions, and the like from damaging property (available at: http://www.nwr.noaa.gov/Marine-Mammals/Seals-and-Sea-Lions/upload/Deter-Pinnipeds.pdf). These include:
1. barriers and exclusion devices such as fencing (e.g., plastic construction/snow fence, chain link), closely spaced posts, bull rails, electric livestock fencing, netting, and swim step covers;
2. visual repellents such as flags, pinwheels, streamers, flashing lights, strobes, balloons and human attendants/monitors;
3. noise makers such as horns, whistles, bells, electronic acoustic devices (Acoustic Harassment Devices), clapping, banging on pots, pans, drums, empty aluminum cans on a string banging together, music, starter pistols, and pyrotechnics (e.g., bird screamers, bangers, firecrackers, propane canons); and
4. physical contact such as high or low pressure water hoses, sprinklers, sprayers, crowder boards, poles (blunt tip), brooms, cattle prods, toy water guns, non-toxic and water soluble paint ball or air soft guns, slingshots and chemical irritants (e.g., non-toxic pepper spray, mace) used for animal control.

Many (or even most or all) of these prior art deterrent devices have one or more drawbacks. For example, deterrents such as pyrotechnics and slingshots can potentially harm the animals as well as present a potential for property damage. In addition, most of the suggested or utilized methods and devices known in the prior art have potentially significant drawbacks. Among other things, they can require complex and difficult installation, cause installation-related damage to property, interfere with or preclude the desirable use of space in areas where they are installed, require energy to operate, potentially cause harm to humans and other animals, be potentially hazardous to the surrounding environment, can be difficult to remove/store/maintain, and/or present aesthetic (i.e., "eyesore")/acoustic/and/or/chemical pollution to the surrounding environment. In any effort to address these problems, economic and other factors typically are taken into consideration and/or impact such efforts.

Accordingly, there is a need for deterrent devices and/or methods that accomplish the desired deterrence while overcoming some/most/all of the foregoing or other drawbacks presented by prior art deterrent systems.

SUMMARY OF THE INVENTION

For the purpose of summarizing the invention, certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

It is therefore an object of the present invention to provide a deterrent device that is easy to install, remove and store without causing damage to the structure on which it is installed (and/or while minimizing any such "damage").

Further, it is desirable to provide a deterrent device that does not occupy a lot of space while in use or when in storage. Preferably, the device is stackable and/or otherwise modular to some degree, and is therefore capable of being stored in relatively small spaces.

In addition, while in use, preferably the device does not preclude the normal use of an area even while it is installed there. Certain embodiments can provide this advantage in the form of a series of relatively low, small, modular, spaced "deterrent units." Preferably, spacing between the units ranges from 12 to 14 inches in order to allow an "average" sized shoe to fit in between the units. Persons of ordinary skill in the art will appreciate that the invention is not limited to these preferred dimensions and that, depending upon a variety of factors (including the intended use of the invention, the type of surface where the device is installed, etc.) a limitless number of configurations are possible.

Furthermore, it is an object to provide a deterrent device that does not harm any animals (although it may cause them sufficient discomfort to prompt them to move), and does not pose a threat to humans, other animals, or to the surrounding environment.

Also, it is desirable to provide a deterrent device that does not consume or waste excess energy, does not require significant maintenance, and does not present significant aesthetic, acoustic, or chemical pollution to the surrounding environment. In fact, many of the preferred embodiments of the invention do not use or require any energy.

According to a preferred embodiment of the present invention, a deterrent device is provided that effectively discourages and/or prevents animals from getting onto a structure prone to haul-outs, and if any of those animals successfully get onto such a structure, the embodiment also safely irritates and/or annoys the animals so that they get off and/or leave.

These and other objects and advantages, as well as some of the many alternative embodiments in which the inventions can be practiced, will become readily apparent to those skilled in the art from the following detailed description of the preferred embodiments having reference to the attached figures. The invention is not limited to any particular embodiment(s) disclosed herein.

BRIEF DESCRIPTION OF THE DRAWINGS

FIG. 16(b) shows a mounting means of a deterrent device according to an alternative embodiment of the present invention, comprising a mounting bar and another alternate clip means. The sectioned/removed portion is shown in phantom.

FIGS. 16(d-f) show alternate attaching means of a glue pad according to an alternative embodiment of the present invention.

FIGS. 17(d-f) show alternate attaching means of a glue pad according to another alternative embodiment of the present invention.

FIGS. 22(a-b) show a perspective and top view respectively of a deterrent device and method of attachment to a structure according to an alternative embodiment of the present invention.

FIG. 22(c) is a cross-sectional view taken along line 22(c)-22(c) of FIG. 22(b).

FIG. 24(*c*) is a cross-sectional view taken along line 24(*c*)-24(*c*) of FIG. 24(*b*).

FIG. 25(*b*) is a side view of the arrangement of FIG. 25(*a*) when viewed along line 25(*b*)-25(*b*).

DETAILED DESCRIPTION

Figure 1:
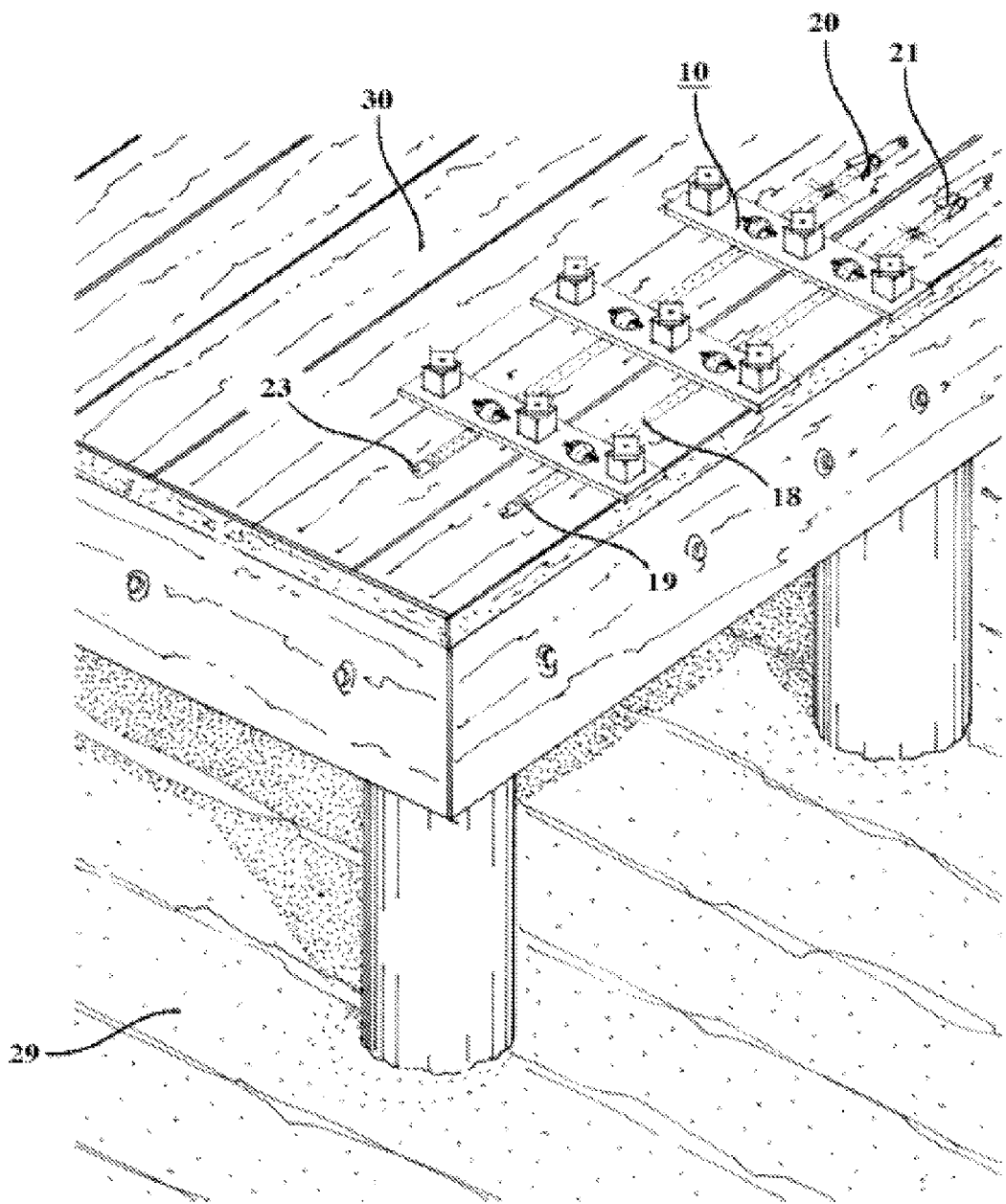
FIG. 1 is a perspective view of marine dock equipped with a deterrent device according to a preferred embodiment of the present invention.

Embodiments of the present invention will now be described with references to the accompanying figures, wherein like reference numerals refer to like elements throughout. The terminology used in the description presented herein is not intended to be interpreted in any limited or restrictive manner, simply because it is being utilized in conjunction with a detailed description of certain embodiments of the invention. Furthermore, various embodiments of the invention (whether or not specifically described herein) may include novel features, no single one of which is solely responsible for its desirable attributes or which is essential to practicing the invention herein described.

Although the examples of the many various methods of the invention are described herein with steps occurring in a certain order, the specific order of the steps, or any continuation or interruption between steps, is not necessarily intended to be required for any given method of practicing the invention.

Persons of ordinary skill in the art will understand that the apparatus of the invention and various of its many methods can be practiced using any of a wide variety of suitable processes and materials. By way of example and not by way of limitation, certain embodiments of the apparatus can be manufactured via processes using one or more steps of routing, drilling, turning, injection molding, thermo-forming, casting, and many other existing and new processes that may come into being. Materials are not limited in any way and could extend from metals to plastics, to resins of all types. A preferred material is non-corrosive and will hold up to the exposure anticipated in its eventual usage including UV exposure, salt water, marine environments, etc. A preferred method of manufacture is by injection molding various components of the embodiments, and by machining others and/or buying them from commercially-available sources (an approach that may be useful, for example, in procuring clips, screws, bars, straps, or the like).

Figure 4:
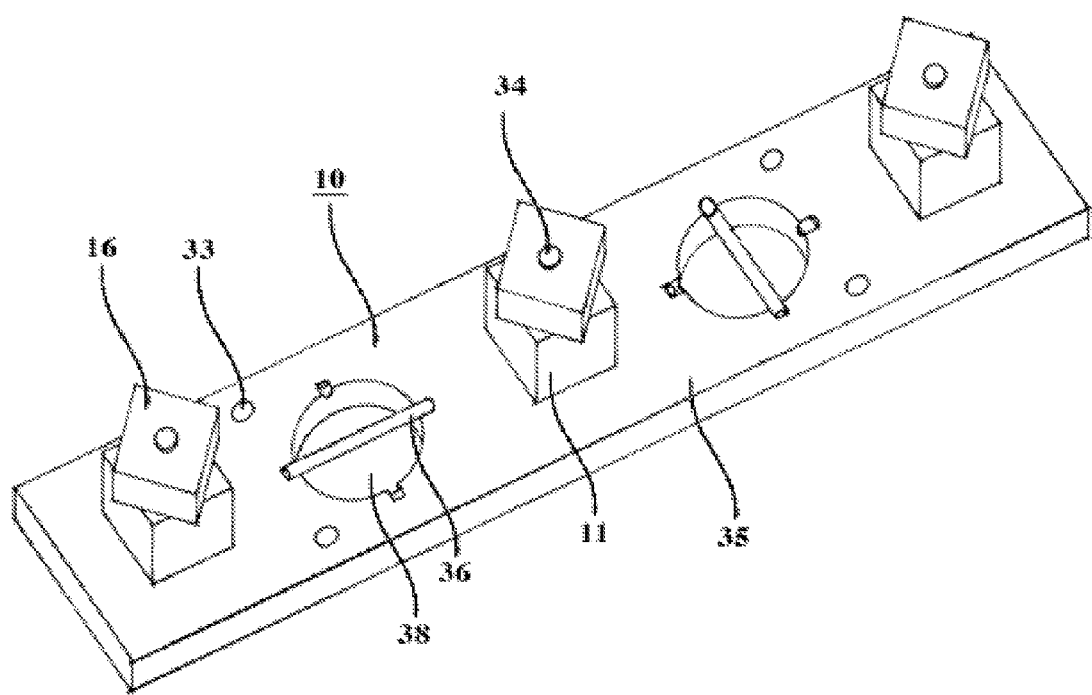
FIG. 4 is a detailed perspective view of a deterrent device according to a preferred embodiment of the present invention.
Figure 5:
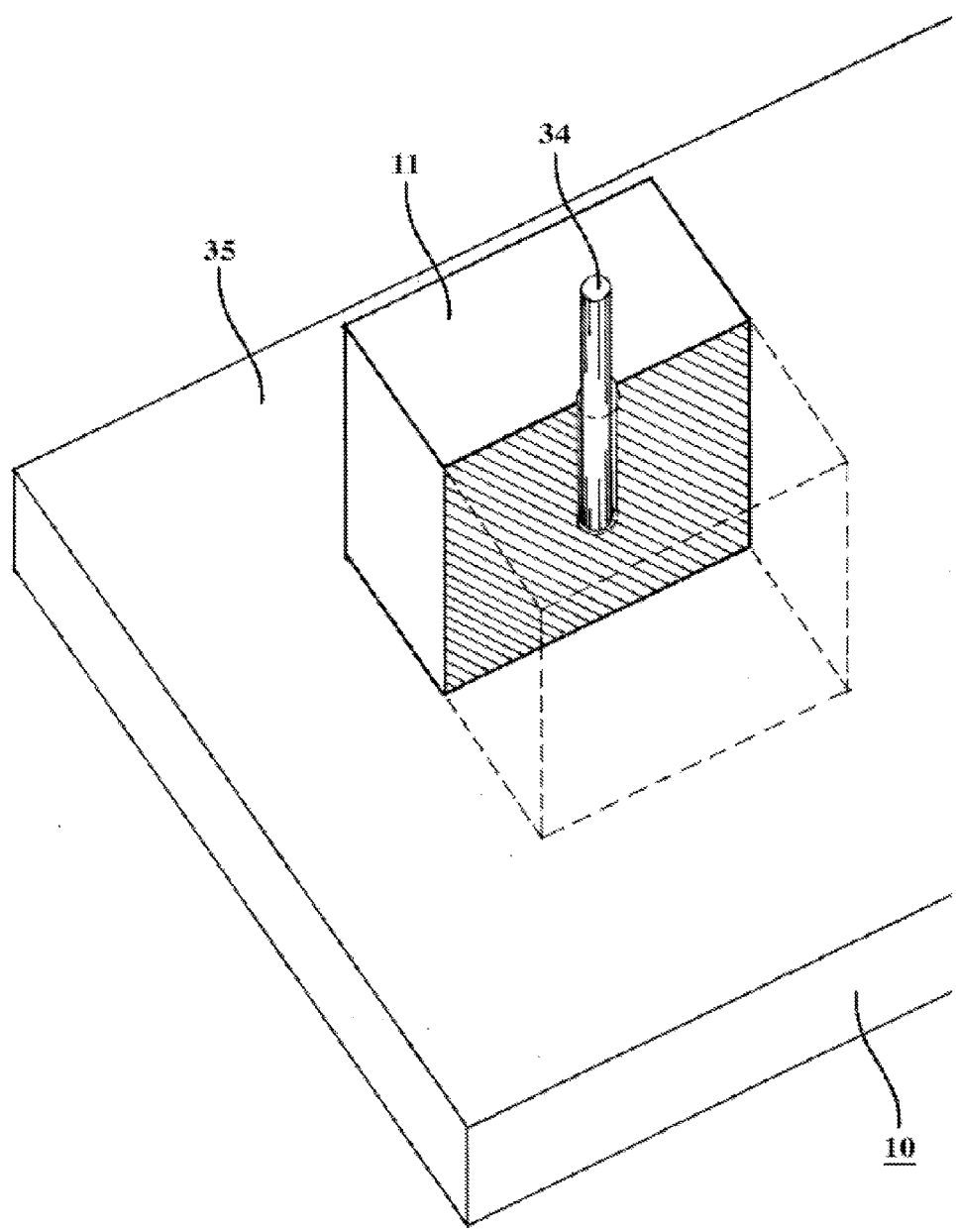
FIG. 5 is a sectional perspective view of a stand-off block of a deterrent device according to a preferred embodiment of the present invention. The sectioned/removed portion is shown in phantom.
Figure 6:
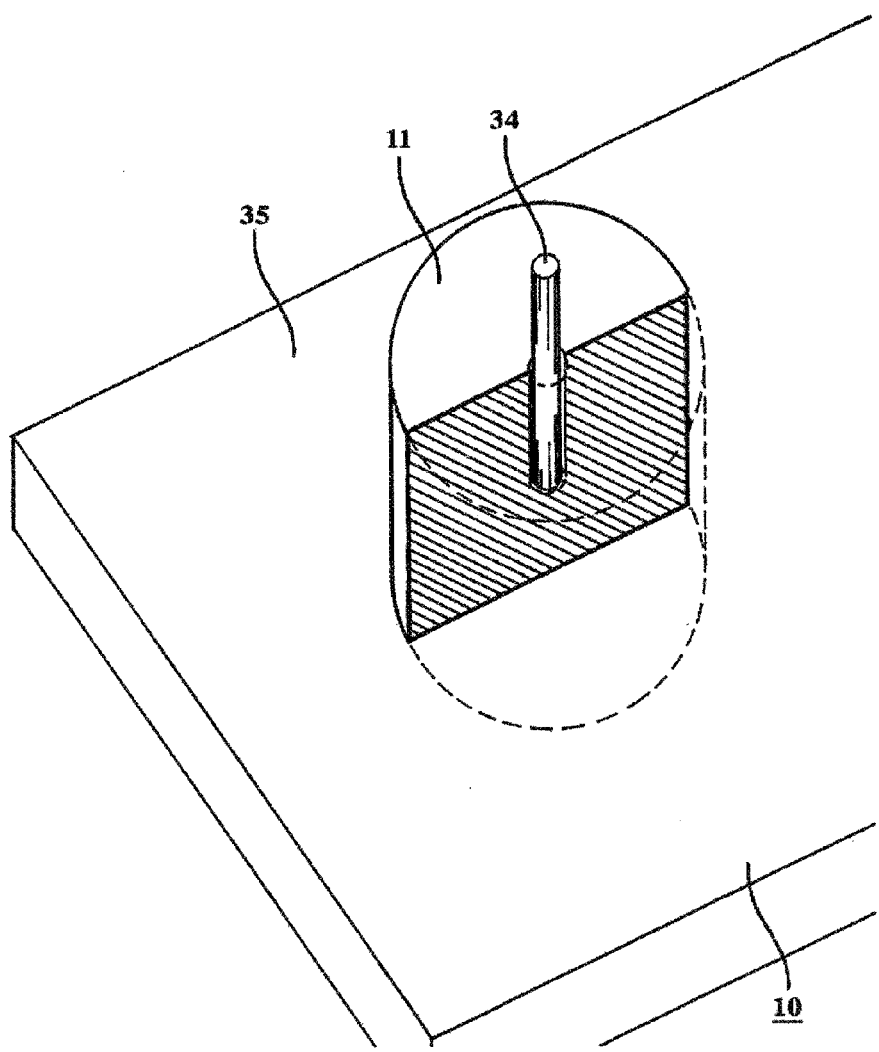
FIG. 6 is a sectional perspective view of a stand-off block of a deterrent device according to one of the many alternative embodiments of the present invention. The sectioned/removed portion is shown in phantom.
Figure 7:
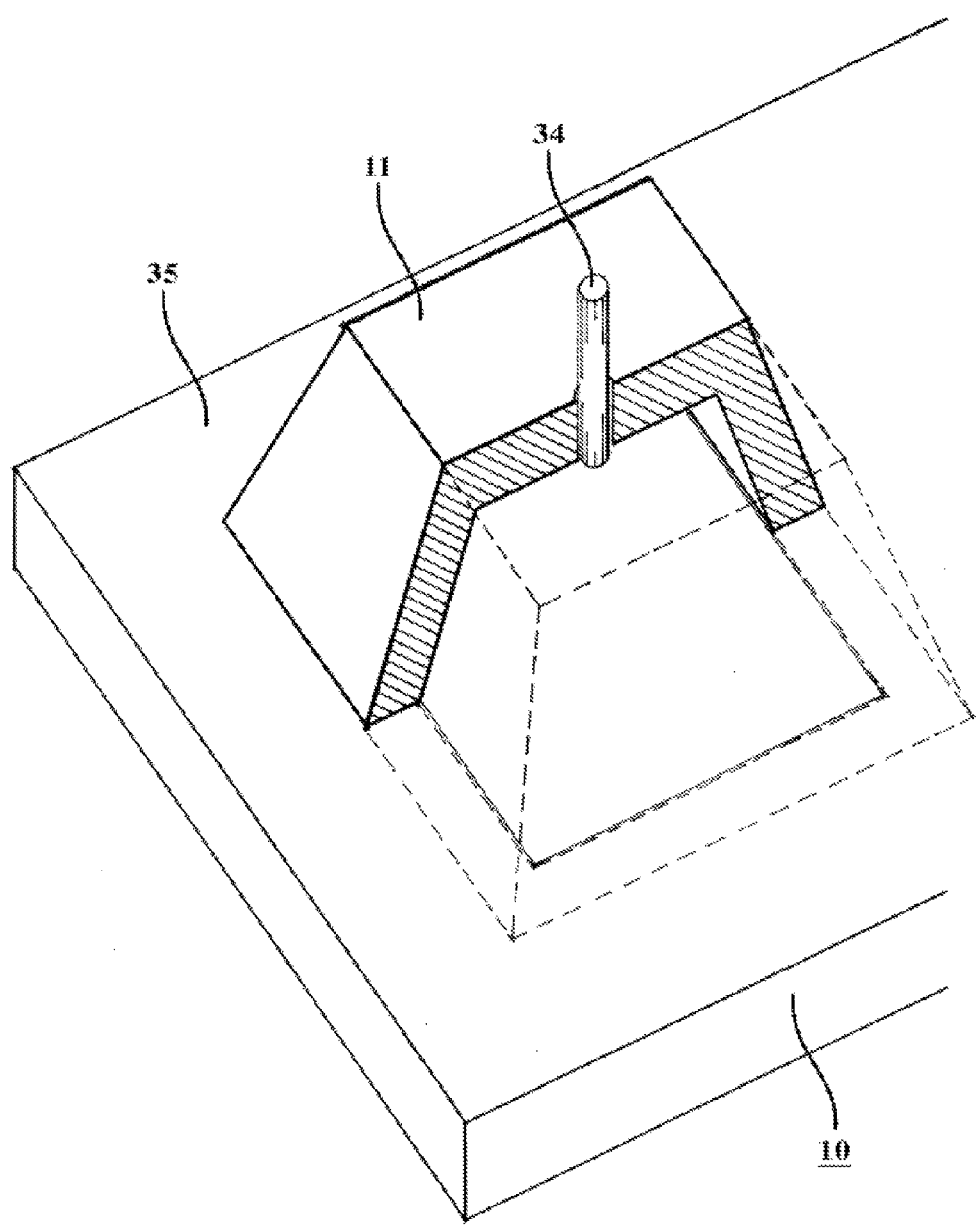
FIG. 7 is a sectional perspective view of a stand-off block of a deterrent device according to another of the many alternative embodiments of the present invention. The sectioned/removed portion is shown in phantom.
Figure 8:
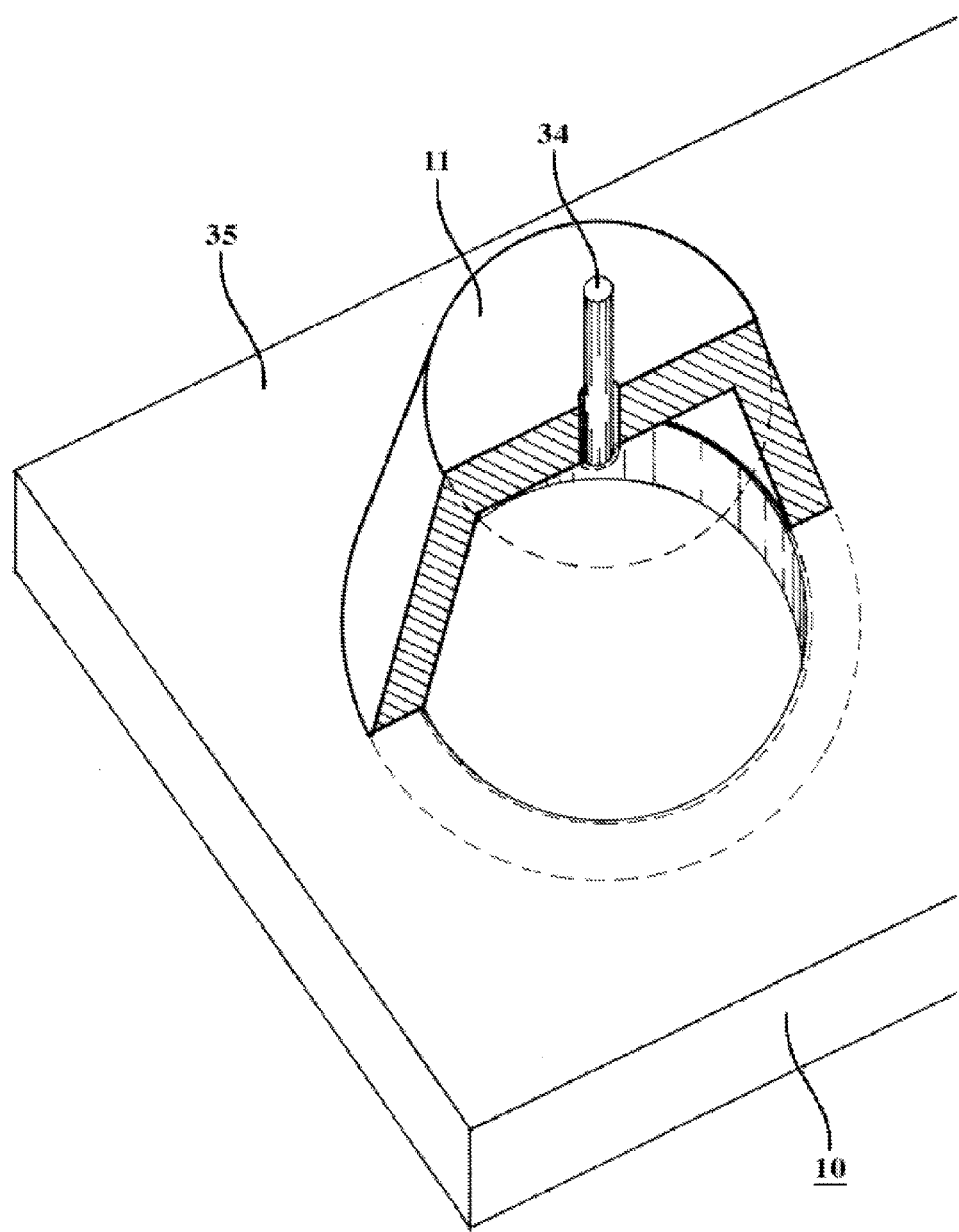
FIG. 8 is a sectional perspective view of a stand-off block of a deterrent device according to yet another of the many alternative embodiments of the present invention. The sectioned/removed portion is shown in phantom.
Figure 9:
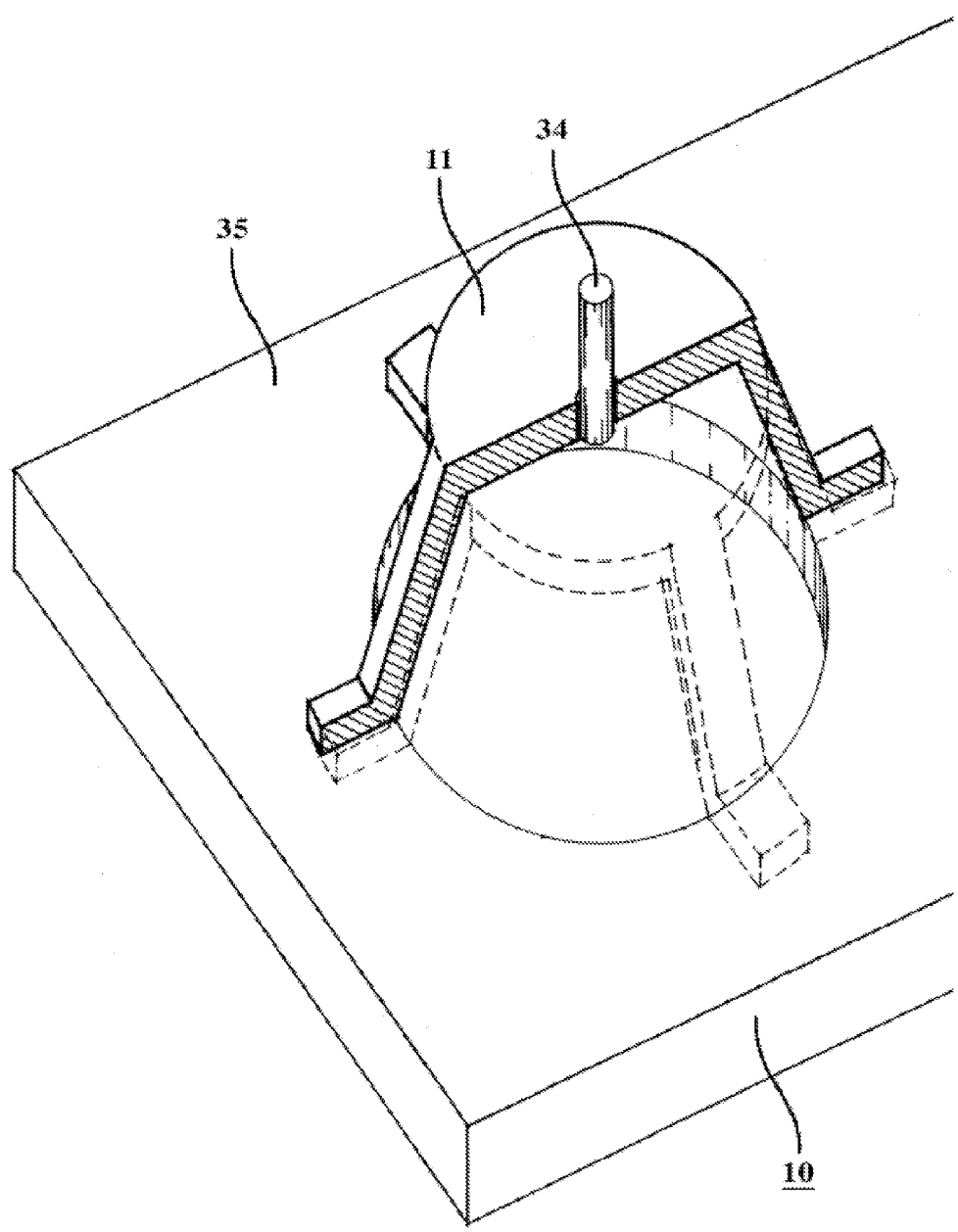
FIG. 9 is a sectional perspective view of a stand-off block of a deterrent device according to still another of the many alternative embodiments of the present invention. The sectioned/removed portion is shown in phantom.

As shown in FIG. 4, a preferred embodiment of the deterrent device 10 of the present invention preferably includes, among other things, at least one irritating non-fixed/releasing/rotating element 16, a stand-off block member 11, a base support member 35, and temporary attachment means. As will be further described herein, some of the many alternative embodiments of the invention can be practiced without all of those elements, and some with as little as a rotating/irritating element. Moreover, persons of ordinary skill in the art will understand that even that releasing/rotating/irritating element can be provided in other embodiments in a wide variety of other forms, such as sliding or moving elements or otherwise (or combinations of such movements), to thereby help ensure that an animal can move onto and away from the deterrent device with minimal or no damage to the animal (thus, the animal preferably only experiences sufficient discomfort to motivate it to move from the "deterred" surface).

The deterrent device of the present invention can be used in a wide range of applications. In a preferred embodiment, it can be used to discourage and prevent marine-dwelling animals such as seals from getting onto structures such as boats, docks, marine vessels and other marine structures and things, and to irritate and annoy those animals that successfully get on a structure so that they get off and/or leave. Persons of ordinary skill in the art will appreciate that although the present invention is directed to preventing marine-dwelling animals from occupying space on marine vessels and structures, the benefits provided by the present invention are not limited to deterring marine animals from marine structures, but may be applied to deterring any pest or other animal, including humans, from occupying space on any type of structure where the device is installed.

FIG. 1 illustrates one of many applications of the present invention wherein the deterrent device 10 is preferably temporarily attached to a marine structure such as a dock 30 which is surrounded by a body of water 29. Docks are well-known in the art and are typically constructed of a relatively soft, penetrable material such as wood so that the deterrent device 10 can be easily installed on such a structure in order to prevent seals and other marine-dwelling animals from getting onto or occupying its surface. As illustrated in the figure, the deterrent device 10 may be temporarily attached to the surface of the dock 30 by temporary attachment means. In one embodiment, the temporary attachment means may include a tethering means which comprises a series of strap elements 18 provided through openings 38 in base support member(s) 35. The strap elements 18 may be temporarily attached to the dock's surface by any suitable fastening means such as with screws, bolts, clips, nails, etc. Alternatively, the strap elements 18 may be permanently affixed to the dock's surface if desired. Persons of ordinary skill in the art will understand that there may be circumstances wherein it is desirable to provide the deterrent device as a permanent fixture onto a structure. On the other hand, however, the deterrent device is preferably designed to be temporarily attached to a structure so that it may be easily and readily removed from an area when persons want to use or occupy that area, want to use the deterrent in another location, or otherwise desire the relevant surface to be cleared or open.

As shown in further detail in FIG. 14(*a*) in a preferred embodiment of the present invention, the strap elements 18 of the tethering means are provided through openings 38 provided in the base support members 35 of the deterrent device 10 in order to tether the device to a structure and prevent it from being moved or displaced while in use. Specifically, a strap element 18 is provided through an opening 38 in the base support member 35, over a mounting bar member 36 of the device 10, and back through the same opening 18 in the base support member 35. In order to attach the deterrent device to a structure, the strap element 18 is affixed at both ends 19 to the structure with any suitable fastening means and pulled or ratcheted tight. When this occurs, a downward pressure is applied to the mounting bar member 36 by the strap element 18 which in turn secures the deterrent device 10 to a structure. In addition, the strap element is preferably positioned on the surface of the structure so that it does not present a tripping or other hazard to persons who may need to use the space where the device is installed. Persons of ordinary skill in the art will appreciate that the number of deterrent devices used and the number of openings provided in each deterrent device may vary depending upon the intended use and therefore, the straps may be provided in any suitable length for tethering any desired number of deterrent devices to a structure. Further, a single strap may be provided to tether down one or a plurality of deterrent devices, and/or a plurality of straps may be provided to tether down one or a plurality of deterrent devices. In addition, the strap element may be made of any appropriate material for securing the deterrent device to a structure, such as bungee cord, strap, rope, cable and wire rope, to name a few.

Furthermore, persons of ordinary skill in the art will understand that the tethering means described herein is just one of a wide variety and plurality of possible attachment methods for temporarily or fixedly attaching the deterrent device to a structure. Although a few alternative methods are discussed below, the attachment means are not limited to only those described herein. For example, there are many attachment methods known in the prior art which would be suitable for attaching the present deterrent device to a desired structure, such as magnetic and Velcro attachment means, suction cups, and/or capillary action, to name a few.

Figure 14A:
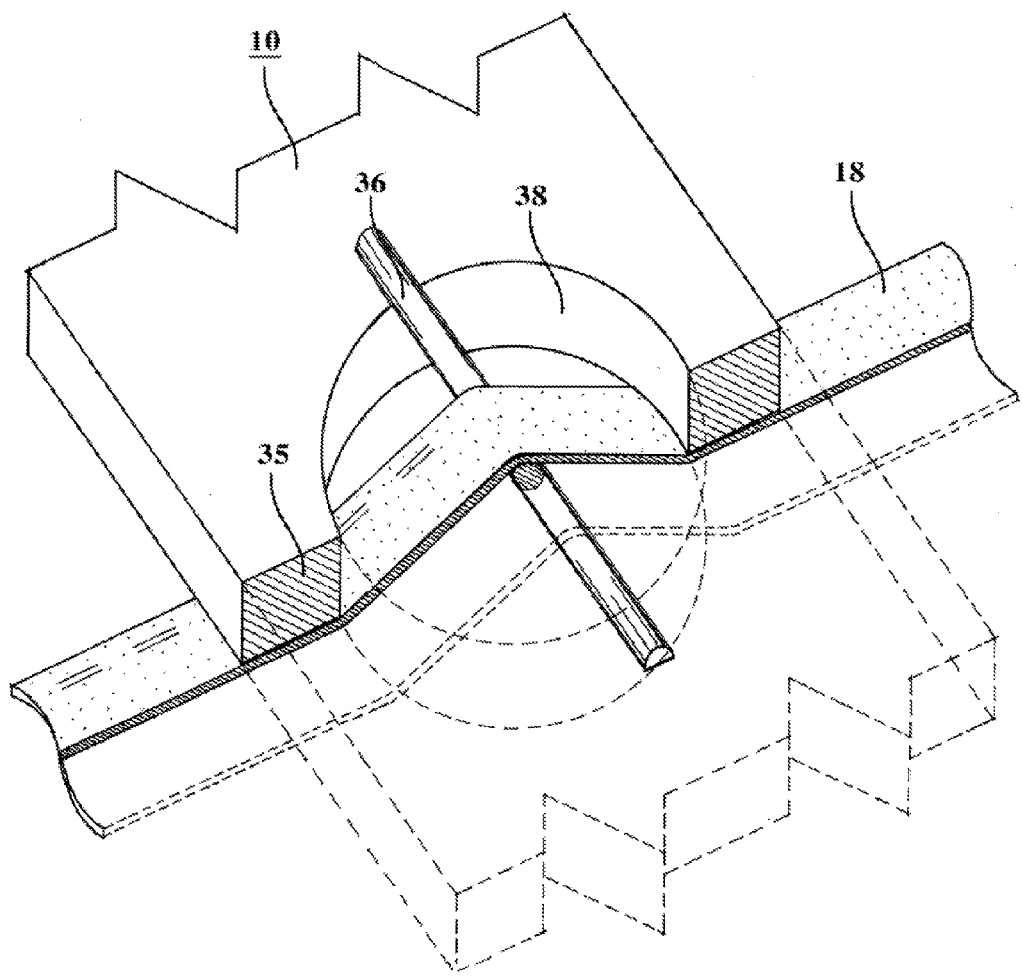
FIG. 14(a) is a sectional perspective view of the mounting means of a deterrent device according to a preferred embodiment of the present invention, comprising a mounting bar and tethering means. The sectioned/removed portion is shown in phantom.
Figure 14B:
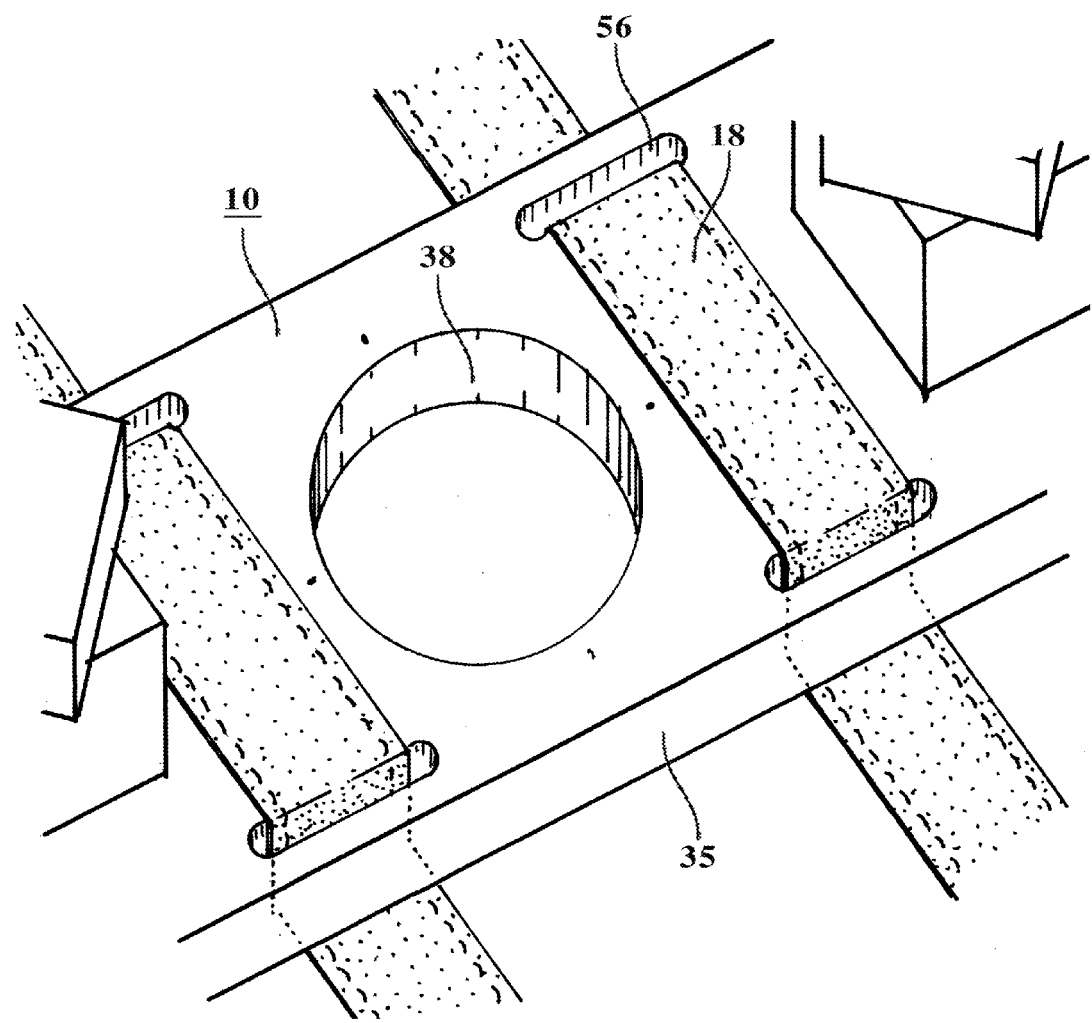
FIG. 14(b) is a detailed perspective view of the mounting means of a deterrent device according to one of the many alternative embodiments of the present invention, comprising mounting slots or notches with straps or similar elements cooperatively engaged with the slots.

FIG. 14(b) shows another of the many alternative mounting means of the present invention, comprising another strapping system. Specifically, strap elements 18 are placed through slots or notches 56 that are provided in the base support member 35 of the deterrent device 10. Preferably, such straps are sufficiently flexible to be readily inserted and adjusted during assembly and/or installation of the apparatus, but also sufficiently strong and/or sturdy to withstand the anticipated environmental conditions into which the apparatus will be deployed. The straps 18 can be used to tether the device to a structure and/or other thing, and may be attached to the structure/thing by any suitable attachment means (even by simply tying together the ends—not shown—of each strap 18 after passing the strap around the thing to which the assembly is to be tethered. Mating quick connect attachment elements can be provided on the strap ends 19, and/or tightening means can be included to facilitate the assembly being "snugged up" into a desired, relatively fixed, position with respect to the thing to which the assembly is to be tethered.

Figure 2:
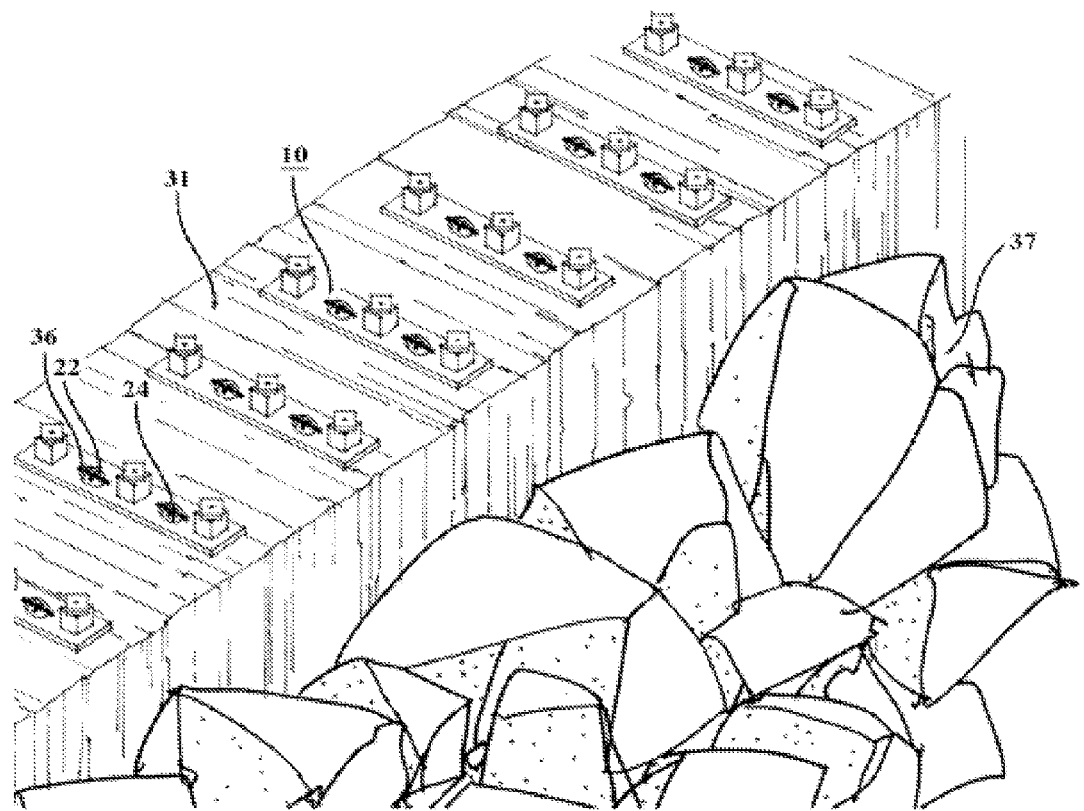
FIG. 2 is a perspective view of a marine sea wall equipped with a deterrent device according to a preferred embodiment of the present invention.
Figure 3:
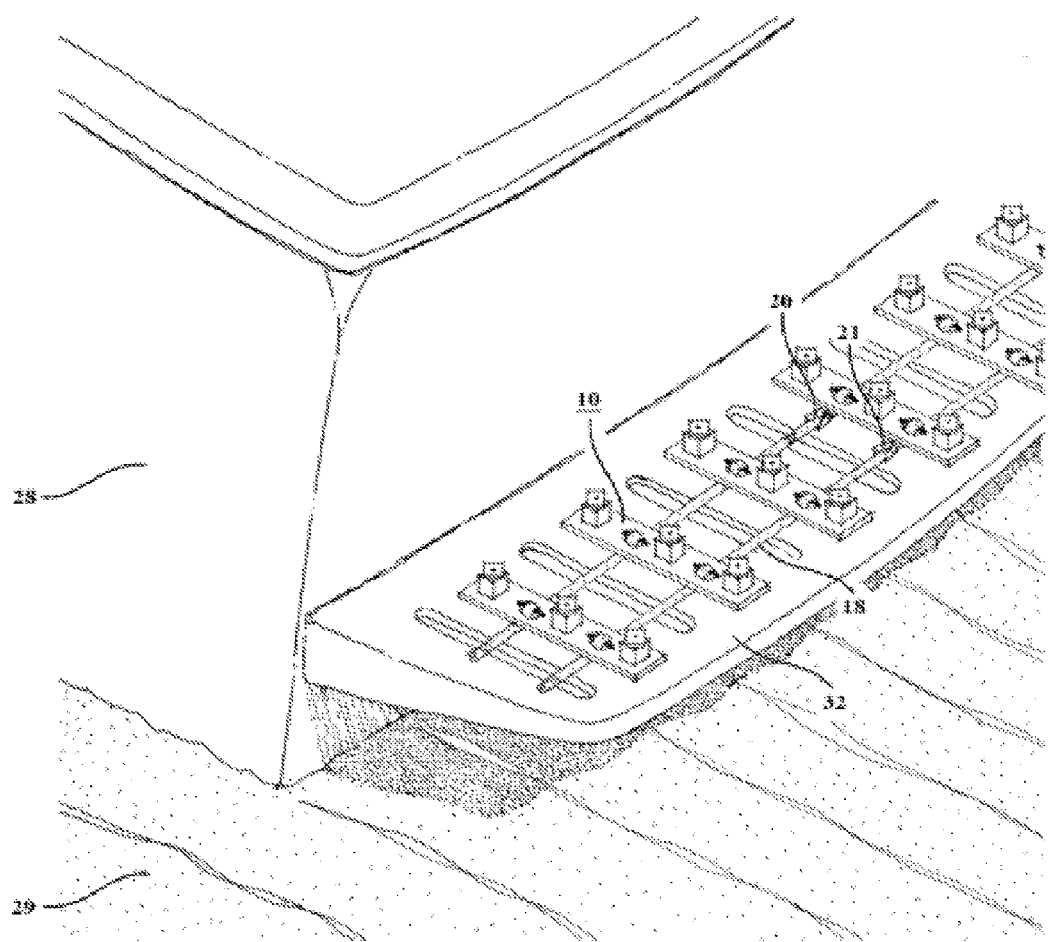
FIG. 3 is a perspective view of a marine vessel swim step equipped with a deterrent device according to a preferred embodiment of the present invention.
Figure 15A:
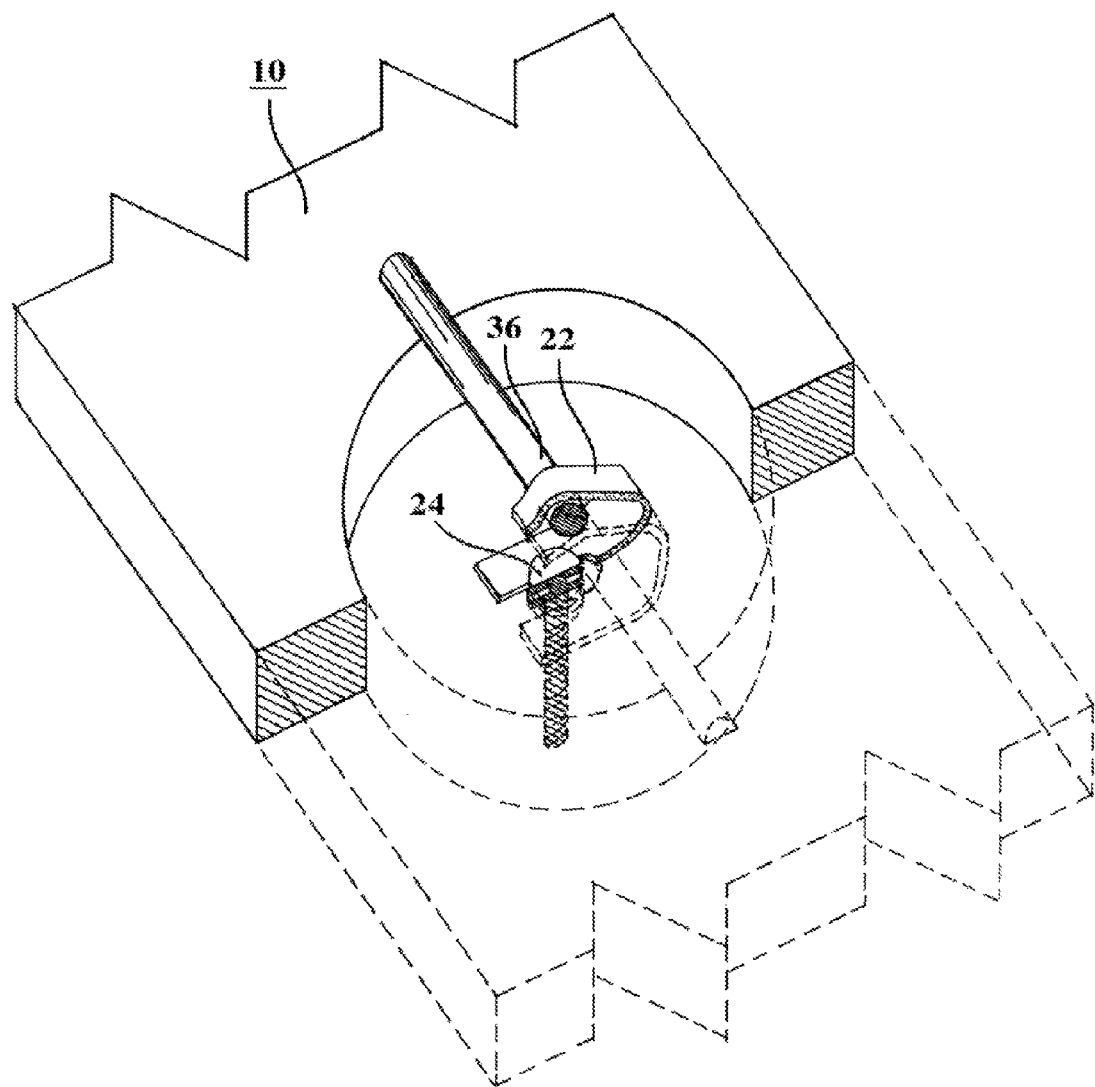
FIG. 15(a) is a sectional perspective view of the mounting means of a deterrent device according to one of the many alternative embodiments of the present invention, comprising a mounting bar clip means. The sectioned/removed portion is shown in phantom.
Figure 16A:
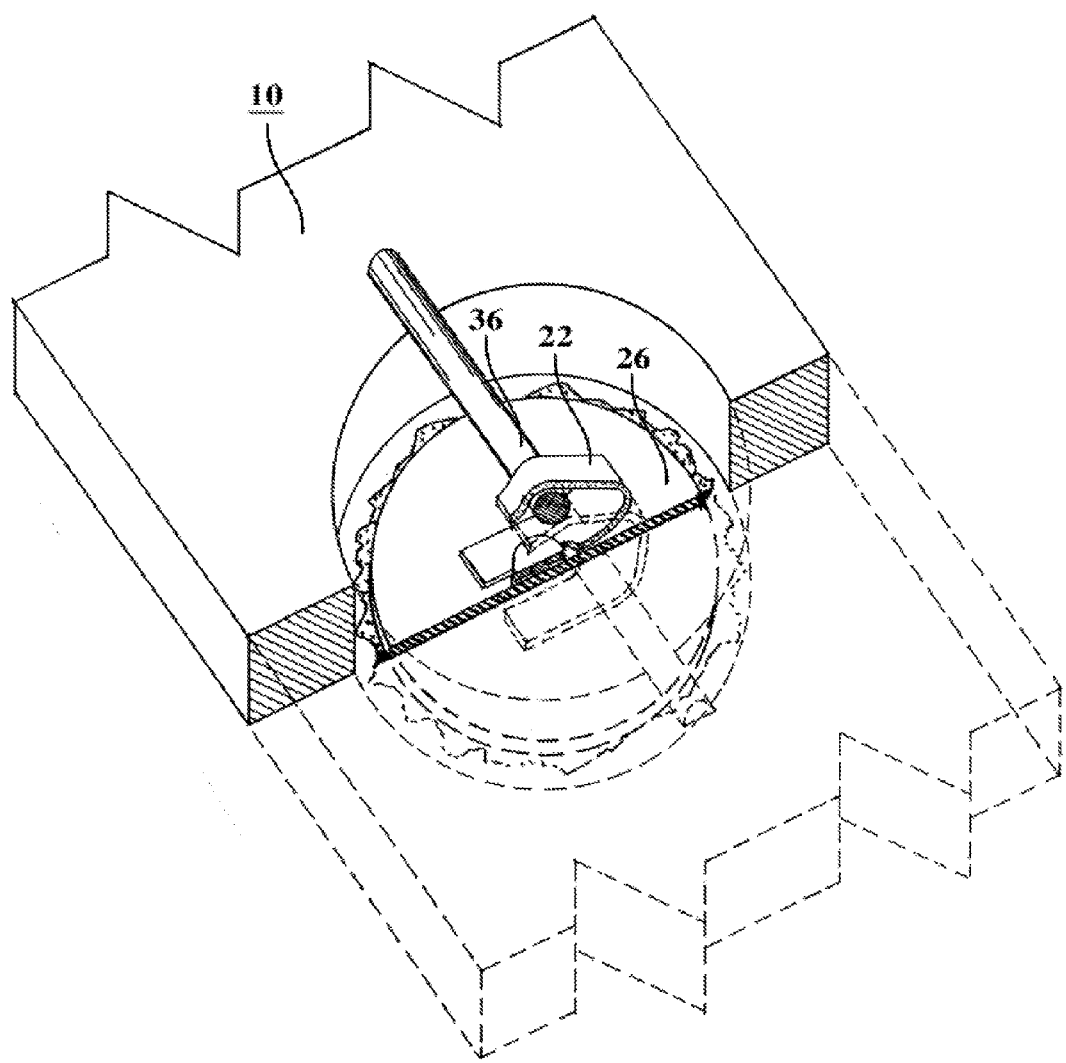
FIG. 16(a) is a sectional perspective view of the mounting means of a deterrent device according to another alternative embodiment of the present invention, comprising a mounting bar and an alternate clip means. The sectioned/removed portion is shown in phantom.
Figure 16C:
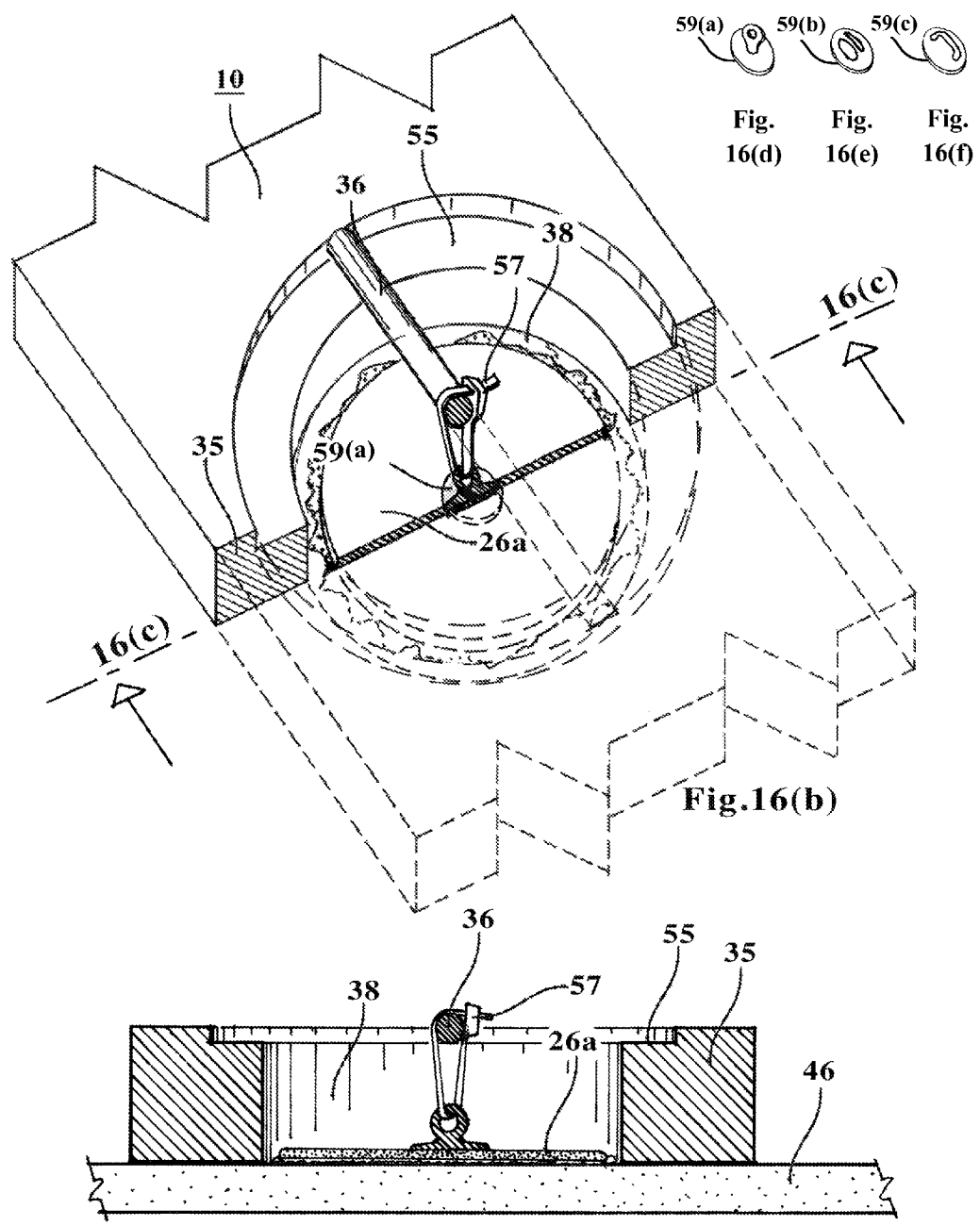
FIG. 16(c) is a cross-sectional view taken along line 16(c)-16(c) of FIG. 16(b).
Figure 17A:
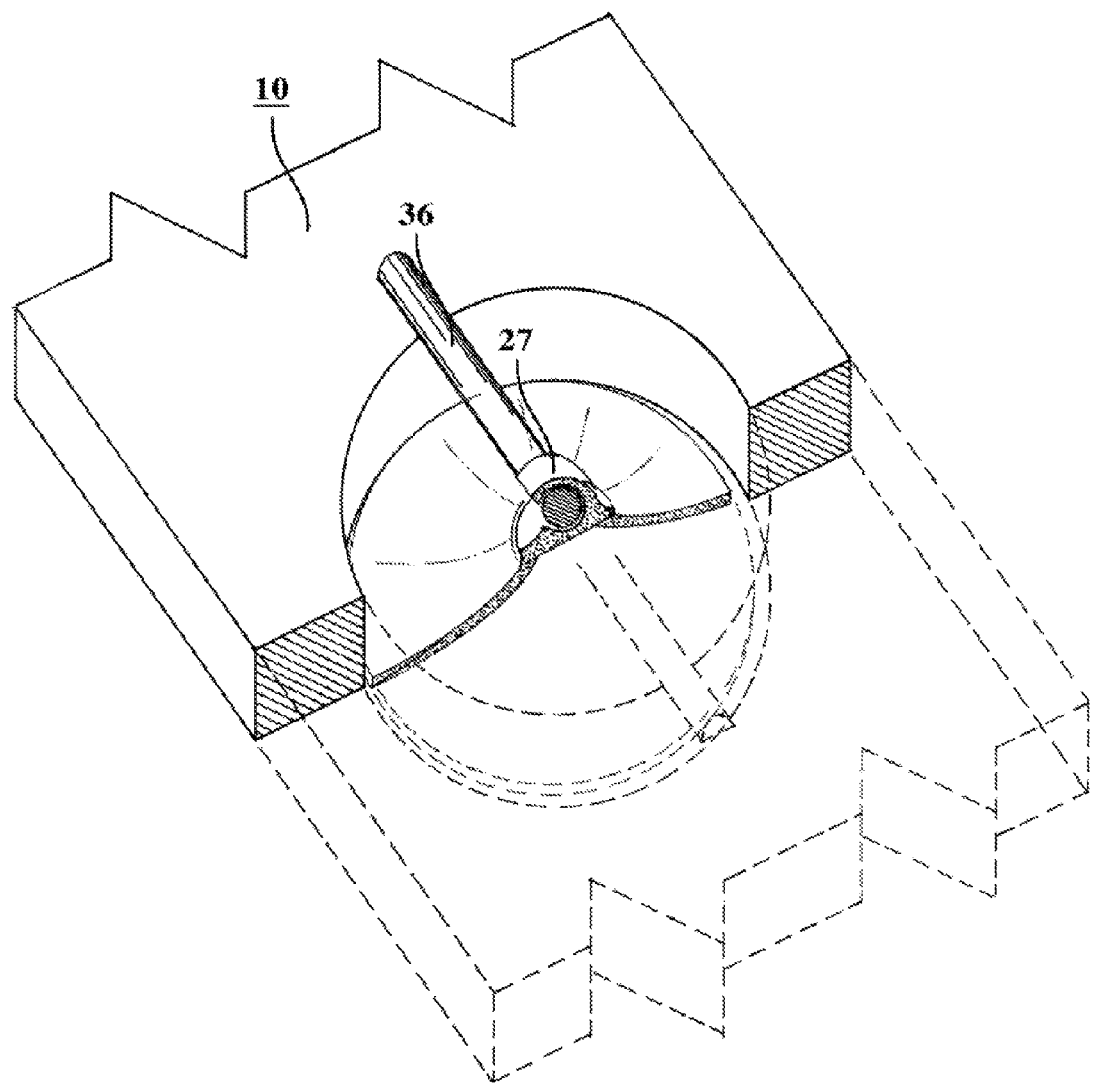
FIG. 17(a) is a sectional perspective view of the mounting means of a deterrent device according to yet another alternative embodiment of the present invention, comprising a mounting bar and a suction means. The sectioned/removed portion is shown in phantom.

FIGS. 1 through 3 illustrate just a few of the many alternative applications of the present invention for deterring pests from getting onto a structure. In FIG. 2, the deterrent device 10 is shown attached to a sea wall 31 that is surrounded by a plurality of break water boulders 37. Typically, a sea wall such as the one shown in FIG. 2 is made of hard and difficult-to-penetrate material, such as reinforced concrete or steel. Preferably, in order to attach the deterrent device to the sea wall structure without having to drill or nail into its hard surface (and therefore marring or destroying the surface), an alternative attachment means such as a clip means is utilized. As shown in detail in FIG. 16(a), the clip means comprises a spring clip 22 or tightening loop such as a zip-tie (such as illustrated as tie element 57 in FIGS. 16(b) and (c), for example) engaged at one end with the mounting bar 36 of the deterrent device 10 and affixed at the other end to a glue pad 26 which is glued or cemented to the surface of the sea wall 31. Alternatively and as shown in detail in FIG. 17(a), the attachment means may include a suction means comprising a suction cup 27 whose clip is attached to the mounting bar 36 of the deterrent device 10 such that the suction cup 27 provides suction of the deterrent device 10 onto the surface of the sea wall. The glue pad and/or suction cup may be provided with alternative attaching means 59(a-c) as shown in FIGS. 16(d-f) and 17(d-f) for attaching a tightening loop such as a zip tie to the glue pad, suction cup or other suitable affixing element. Persons of ordinary skill in the art will appreciate that although it is not ordinarily desirable to drill or nail into the hard surface of a structure such as a sea wall, there may be instances wherein it is preferred that the device be attached to a structure by means of drilling or nailing into its surface. Accordingly, in an alternative embodiment of the present invention, the deterrent device may be attached to the surface of a structure 46 by an alternative clip means such as shown in FIG. 15(a) (wherein a spring clip 22 is engaged at one end with mounting bar member 36 and affixed at the other end to a structure with a screw or bolt 24), by tethering means such as shown in FIG. 14(a) and described above, or even by simply screwing or bolting the base support member 35 of the deterrent device 10 directly onto the structure, to name just a few.

Persons of ordinary skill in the art will understand that any suitable apparatus and/or method may be utilize to retain the apparatus in a desired relationship with the surface or other thing for which the "deterrence" is desired. Among other things, the nature of the "deterred surface" (including, for example, its size and shape and surface characteristics) preferably will be considered in selecting a suitable method and apparatus for retaining the assembly on that surface.

Figure 15B:
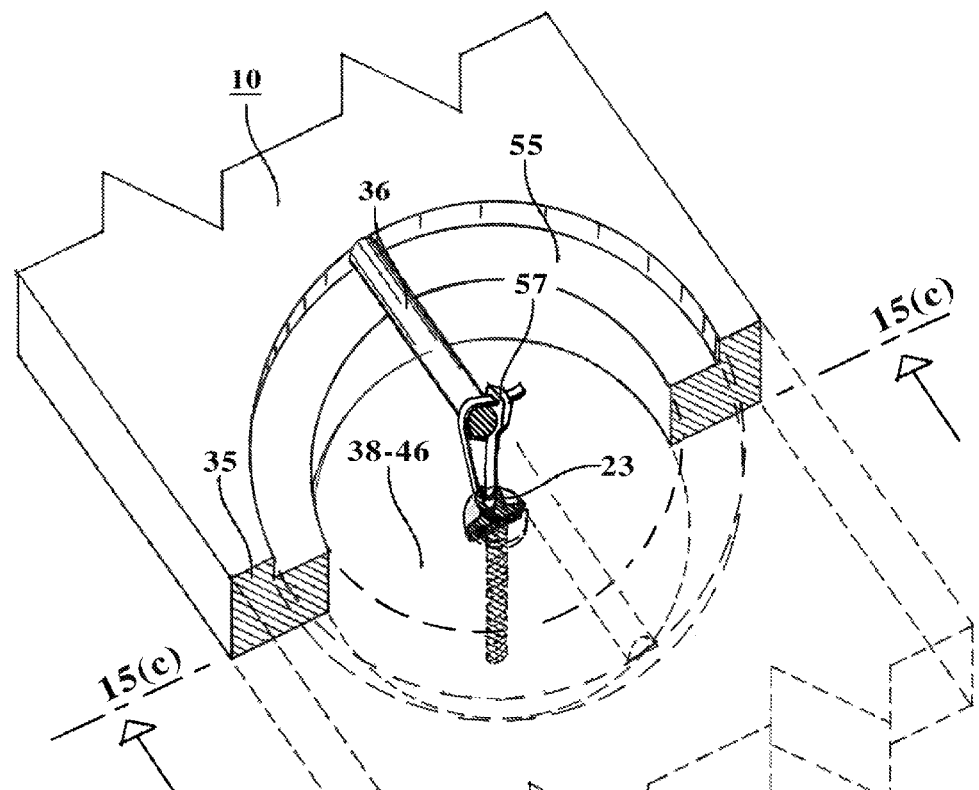
FIG. 15(b) shows yet another mounting means of a deterrent device according to a further alternative embodiment of the present invention, comprising a mounting bar and bolting means. The sectioned/removed portion is shown in phantom.
Figure 15C:
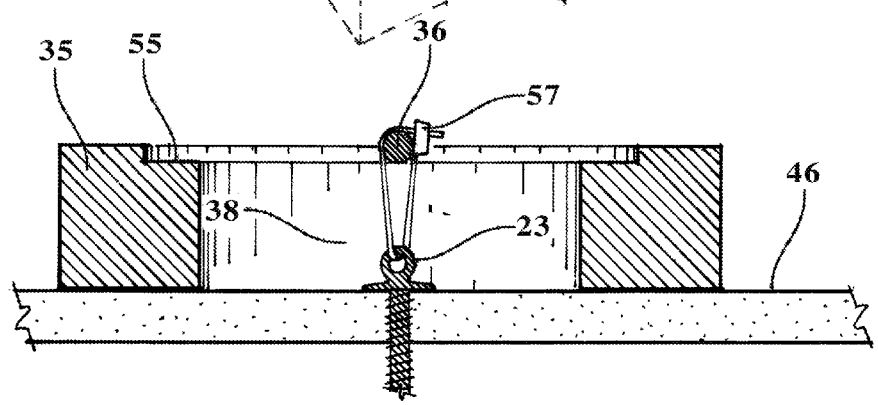
FIG. 15(c) is a cross-sectional view taken along line 15(c)-15(c) of FIG. 15(b).
Figures 17B, 17C:
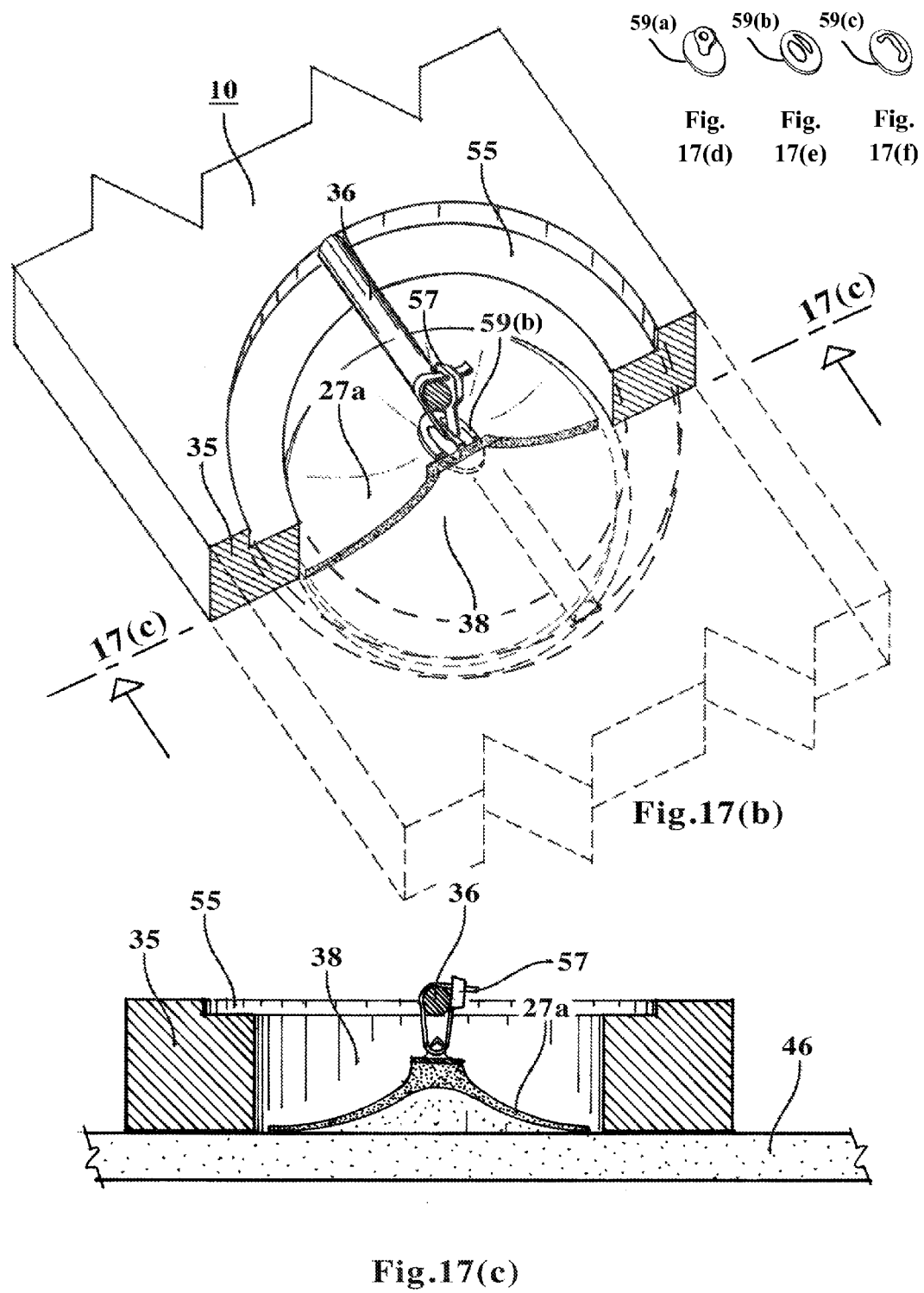
FIG. 17(b) shows a mounting means of a deterrent device according to an alternative embodiment of the present invention, comprising a mounting bar and an alternate suction means. The sectioned/removed portion is shown in phantom.
FIG. 17(c) is a cross-sectional view taken along line 17(c)-17(c) of FIG. 17(b).

By way of example, in an alternative embodiment of the present invention a zip tie (such as illustrated as tie element 57 in FIGS. 16(b) and (c), for example), string, cord, band, or similar tying means may be used to connect the mounting bar member of the deterrent device with a screw, bolt or the like (see for example FIGS. 15(b) and (c)), a glue pad or the like (see for example FIGS. 16(b) and (c)), and/or a suction cup or the like (see for example FIGS. 17(b) and (c)) which is permanently or temporarily attached to the surface of a structure in order to secure the device to the structure. In the example shown in FIGS. 15(b) and (c), a zip tie 57 or similar tying means is engaged at one end with mounting bar member 36 and affixed at the other end to an eye bolt 23 or similar attachment means. The eye bolt is preferably bolted or screwed into the surface of the structure 46 in order to secure the deterrent device to the structure. In FIGS. 16(b) and (c), a zip tie or similar tying means is engaged at one end with mounting bar member and affixed at the other end to a glue pad provided with an eyelet at one end for attachment of the zip tie and attached to the surface of the structure 46 at the other end. Further, in FIGS. 17(b) and (c), a zip tie or similar tying means is engaged at one end with mounting bar member and affixed at the other end to a suction cup provided with an eyelet or loop at one end for attachment of the zip tie and attached to the surface of the structure 46 at the other end.

FIG. 3 illustrates an alternative application of the present invention wherein the deterrent device 10 is attached to a part of a marine vessel or boat 28 such as a swim step 32, wherein the boat 28 is surrounded by a body of water 29. As shown in the figure, the deterrent device 10 is attached to the surface of the swim step by a tethering means comprising a strap element 18 provided through openings in the base support member of the deterrent device and affixed at both ends to the surface of the swim step. The strap element may be attached to the surface by any suitable fastening means such as a screw, bolt, hook, glue, etc. In addition, tightening means such as a cam lock 20 or ratchet 21 may be provided on the strap element 18 in order to tighten the strap down to the surface once the strap element is affixed at both ends, thus securing the deterrent device 10 to the structure. Alternatively, the deterrent device may be attached to the surface of the swim step by clip means such as those shown in FIGS. 15(a) and 16(a), by screwing or bolting the base support member of the deterrent device directly onto the surface of a structure, or by any suitable attachment means described herein.

Persons of ordinary skill in the art will appreciate that, depending upon the application and the type of surface to which the deterrent device is to be attached, the attachment means may vary. Just as a plurality of deterrent devices may be provided in any one application, a plurality of suitable attachment means may be applied to temporarily or fixedly attach each deterrent device to a surface. The attachment means described herein are just a few of the possible means available for securing the present invention to a structure and are not intended to be an exhaustive list. Among the many other alternatives, a plurality of shorter strap elements can be utilized (as short as for just retaining a single deterrent module, rather than a strap sufficiently long to cross over and/or otherwise retain a plurality of deterrent modules).

As illustrated in FIG. 4, in a preferred embodiment of the present invention a deterrent device 10 is provided which comprises a base support member 35 having openings 38 therethrough and a mounting bar 36 provided across the openings for attachment of the device to a desired structure to be protected. Persons of ordinary skill in the art will understand that the concept and precise details of the mounting bar 36 and associated opening as described herein are intended as illustrative of one of many ways in which a deterrent device 10 may be mounted at a desired location.

The device further includes a stand-off block member 11 and associated rotating/irritating element 16. As with the mounting bar and associated opening, the stand-off block member as described herein is intended as illustrative of one of many ways in which a deterrent device 10 may be fabricated, assembled, and used. Among the many alternative embodiments of the invention, a wide variety of spacer means may be employed, including integrally molding elements onto the base 35 to provide a desired amount of spacing. Alternatively, certain embodiments may be practiced with no spacing block (such as by simply ensuring that the element 16 is extended sufficiently "up" from the base 35 to provide the desired deterrent effect). Preferably, the stand-off block member 11 abuts and is attached at one end to the base support member 35 of the device, by any suitable attachment means.

One or more rotating members 16 are preferably rotatably attached to the other end of the stand-off block 11. The desired rotatability of the member 16 can be provided by any suitable means, including without limitation the illustrated an axle member 34 provided through the stand-off block member body and the rotating member body. The axle member 34 allows for the rotatable attachment of the rotating member to the stand-off block. Preferably, the rotating member rotates freely about the axle member while the stand-off block remains stationary. Preferably the corners of the rotating element are sufficiently sharp or pointed so that they are very irritating and uncomfortable to nuisance animals, but also are blunted to some degree. Preferably the corners 39 of the rotating element are sufficiently sharp or pointed so that they are very irritating and uncomfortable to nuisance animals, but also are blunted to some degree. The preferred designs help ensure that, when large animals such as seals haul-out or mount on a structure where the deterrent device is installed, the corners 39 of the rotating element create pressure points on the skin or blubber of the animal as it brushes by or steps on the device, and the rotating element allows that pressure point to turn as the animal passes by, to reduce the risk that the animal's body will be damaged (such as by scraping, poking or stabbing them). Thus, although the rotating member is preferably sufficiently irritating and uncomfortable for animals to lay or rest on (and thus serves to deter or prevent them from mounting on a structure where the deterrent device is installed), it will not harm the animal.

In other embodiments, screw holes 33 may be provided through the base support member 35 of the deterrent device for the direct attachment of the device to a structure via fastening means such as screws, bolts, nails, and the like.

Persons of ordinary skill in the art will understand that the size, shape, number and configuration of the different elements of the present deterrent device may vary depending upon the desired application while not departing from the scope of the invention. As an example, a deterrent device may be provided with one or a plurality of rotating elements while still providing the benefit realized by the present invention. As another example, a single spacing or stand-off block member 11 may have attached to it a plurality of irritating/rotating elements (and/or a single irritating/rotating element may be supported by a plurality of spacing or stand-off block members 11).

FIGS. 5 through 9 illustrate a few of the many alternative embodiments of a stand-off block of a deterrent device. As shown in the figures, the stand-off block may be cube-shaped (FIG. 5), cylindrical (FIG. 6), trapezoidal (FIG. 7), conical (FIG. 8), and/or may be provided as a base structure with a plurality of legs (FIG. 9), to name a few. In addition, the stand-off block of the present invention may be hollow, semi-solid and/or solid. Furthermore, persons of ordinary skill in the art will appreciate that although the stand-off block is preferably provided with an axle for the rotatable attachment of the rotating element, alternative means of attaching the rotating member to the stand-off block member may be used while still allowing the rotating element to rotate freely. Even further, in certain alternative embodiments of the present invention, the stand-off block itself may be capable of rotating, to provide an alternative method/apparatus for both (1) irritating and preventing pesky animals from mounting on a structure and (2) minimizing the risk of harm to the animals.

Figure 10:
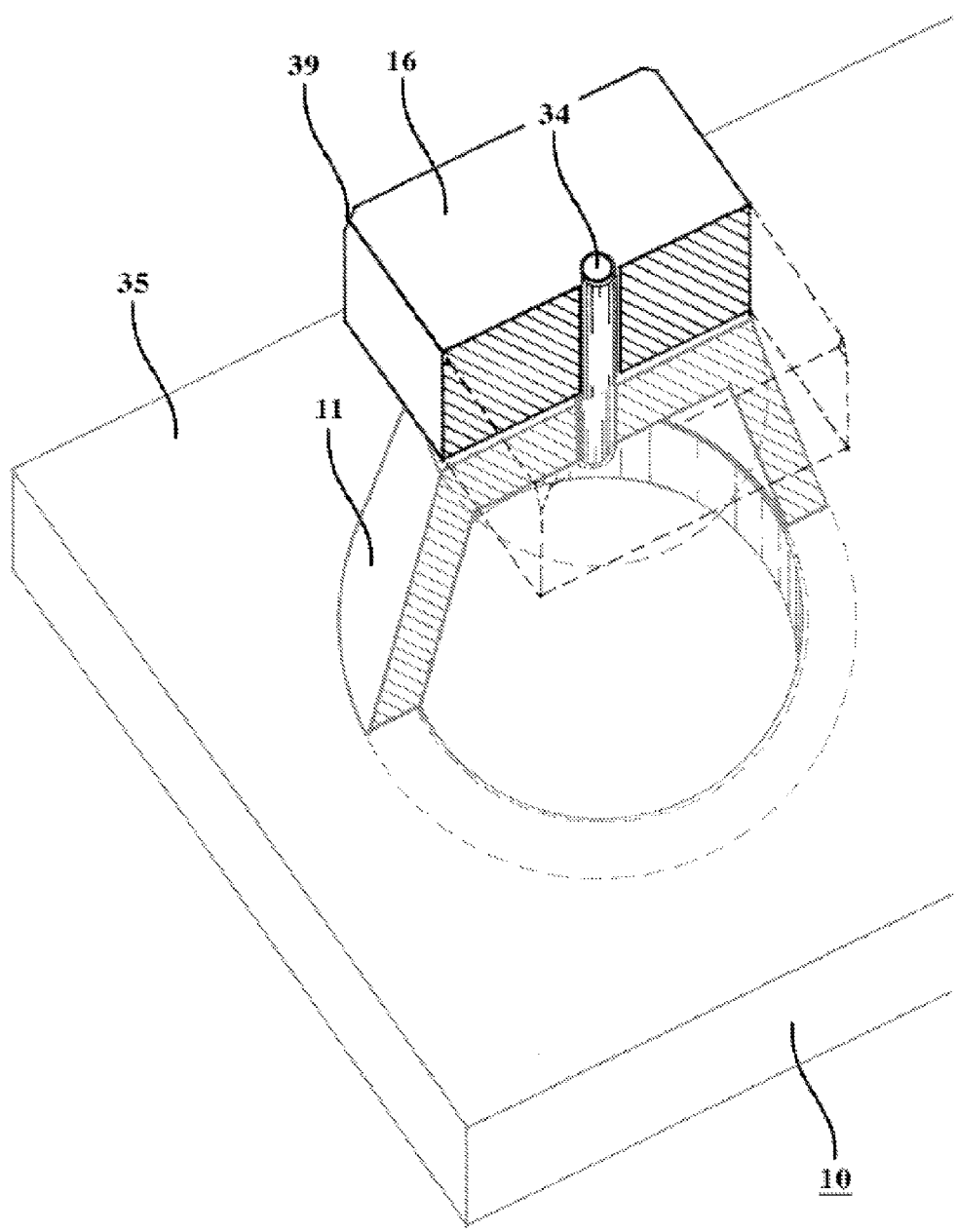
FIG. 10 is a sectional perspective view of a stand-off block and associated rotating element of a deterrent device according to a preferred embodiment of the present invention. The sectioned/removed portion is shown in phantom.
Figure 11:
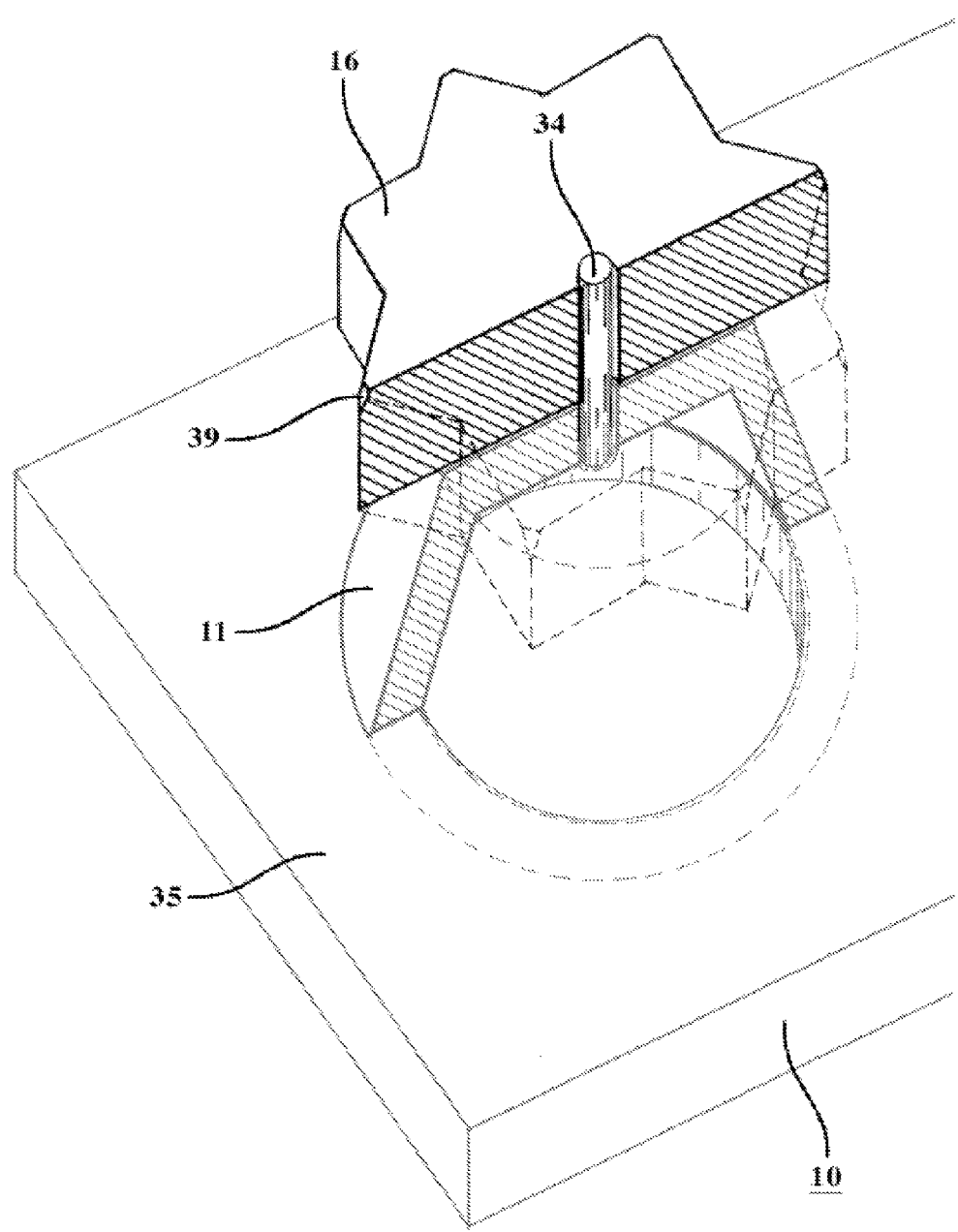
FIG. 11 is a sectional perspective view of a stand-off block and associated rotating element of a deterrent device according to one of the many alternative embodiments of the present invention. The sectioned/removed portion is shown in phantom.
Figure 19A:
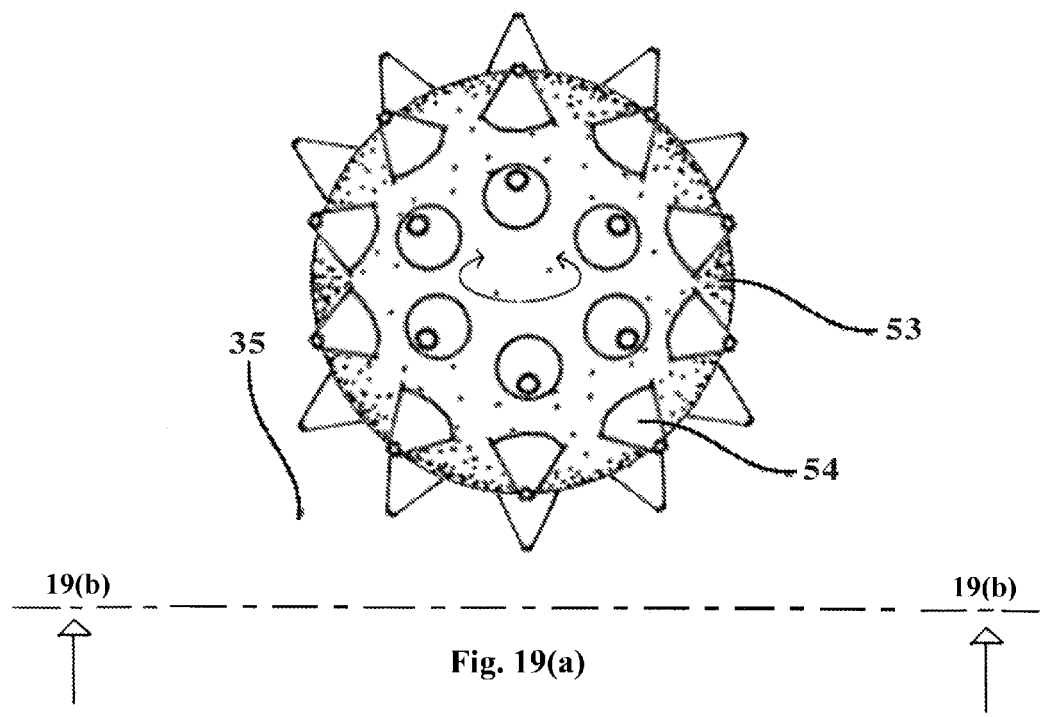
FIG. 19(a) is a top view of a stand-off block and associated spherical rotating element of a deterrent device according to another alternative embodiment of the present invention.
Figure 19B:
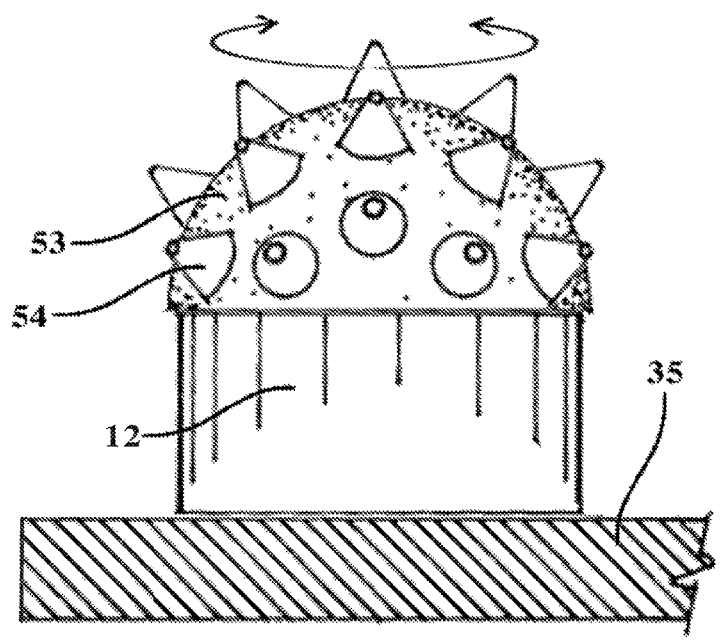
FIG. 19(b) is a side view of the deterrent device of FIG. 19(a) when viewed along line 19(b)-19(b).

FIGS. 10 and 11 illustrate just a few of the many alternative embodiments of a rotating element of a deterrent device. FIG. 10 shows a square-shaped rotating element rotatably attached to a hollow conical-shaped stand-off block, while FIG. 11 illustrates a multi-point star-shaped rotating element rotatably attached to a hollow conical-shaped stand-off block. In an alternative embodiment of the present invention, the rotating element may be rounded and/or spherical, etc., while still presenting an irritating surface to a nuisance animal. For example, FIGS. 19(a-b) show an alternative embodiment of a deterrent device provided with a spherical rotating element 53. Specifically, the spherical rotating element 53 is rotatably associated with a stand-off block member 12 which in turn is attached to a base support member 35. In the embodiment, the rotating element 53 is capable of rotating about the stand-off block member 12 in the direction of the arrows shown in the figure. Furthermore, the spherical rotating element may be provided with an assortment of blunt spokes 54 or similar members in order to irritate animals that comes into contact with the rotating element of the deterrent device.

Figure 18A:
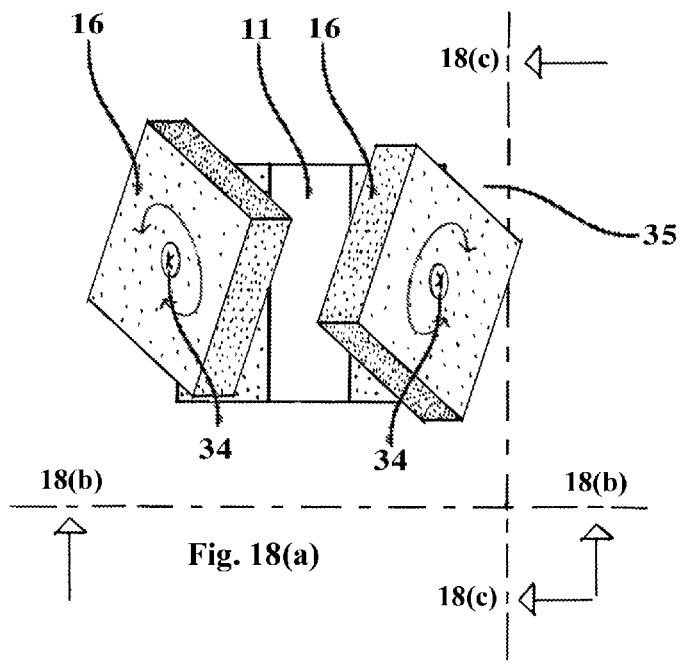
FIG. 18(a) is a top view of a stand-off block and two associated rotating elements of a deterrent device according to an alternative embodiment of the present invention.
Figure 18B:
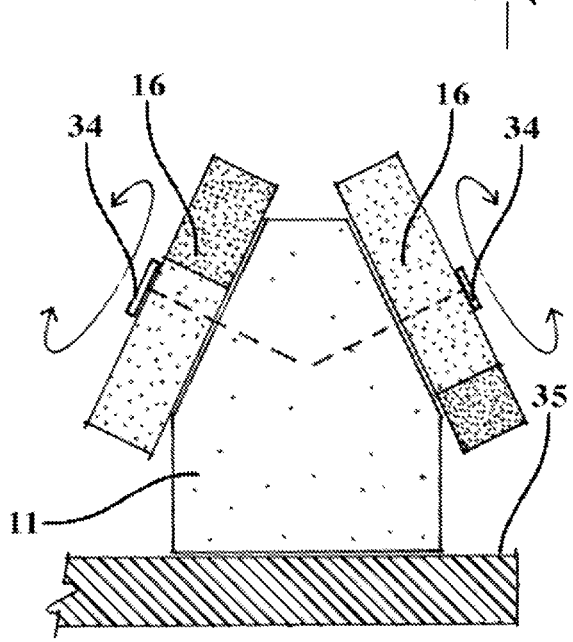
FIG. 18(b) is a front view of the deterrent device of FIG. 18(a) when viewed along line 18(b)-18(b).
Figure 18C:
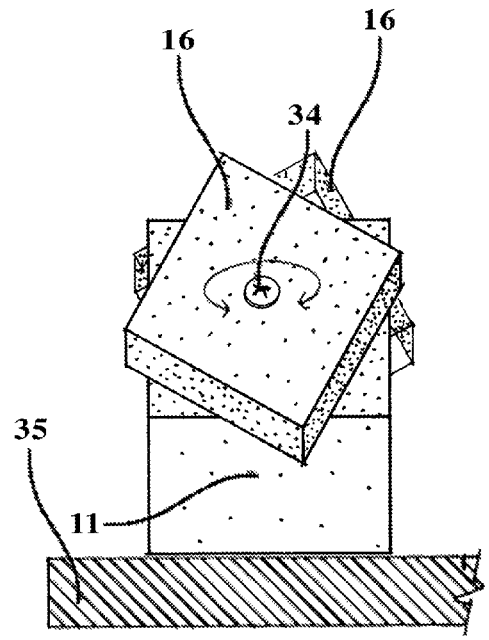
FIG. 18(c) is a side view of the deterrent device of FIG. 18(a) when viewed along line 18(c)-18(c).

Further, in certain alternative embodiments of the present invention, it may be desirable to position the rotating elements at different angles and positions depending upon the intended use of the device. In addition, and as indicated above, it may be desirable to provide more that one rotating element on any one stand-off block member. As an example, FIGS. 18(a-c) depict an alternative embodiment of the present invention wherein the deterrent device is provided with two rotating elements that are each rotatably attached to a stand-off block member at an angle. In the figures, an axle member provides the rotatable attachment of each rotating element to the stand-off block member. Persons of ordinary skill in the art will appreciate that the rotating members may be provided at any desired angle on the stand-off block member and that the number of rotating elements provided on any one stand-off block member is only limited by the size of the stand-off block member. In other words, a large stand-off block member may be provided with numerous rotating members while a smaller stand-off block member may not be able to accommodate as many rotating elements as the large stand-off block member. On the other hand, however, the size and shape of the rotating elements may be adjusted so as to fit more or less rotating elements on a particular stand-off block member.

Persons of ordinary skill in the art will understand that the size, shape and configuration of the elements comprising the deterrent device, such as the rotating elements, stand-off blocks, and base support members, may vary depending upon the intended use of the deterrent device, and that the potential combinations of the different elements are virtually limitless. In addition, it is to be understood that in certain embodiments of the present invention, fewer or greater numbers of each individual element may be provided in any one device while still providing the benefits realized by the present invention. For example, a deterrent device may be provided comprising one stand-off block member and associated rotating member attached directly to a structure, or alternatively a deterrent device may be provided comprising a large, custom-shaped base support member with a plurality of stand-off block members and a plurality of associated rotating members in a variety of shapes and sizes.

Persons of ordinary skill in art will appreciate that in certain alternative embodiments of the present invention, any of the elements comprising the invention may be provided as an integral and/or permanent part of a structure. As an example and as shown in FIGS. 22($a$-$c$), a stand-off block member and associated rotating member may be attached to a base support member that is formed integrally with a structure (or, in effect, may be attached directly "to" the structure in some manner and/or be incorporated into the structure during manufacture). Alternatively, in certain embodiments a stand-off block or rotating member may be attached directly to the surface of a structure without the use of a base support member. In FIGS. 22($a$-$c$), the base support member is provided as a permanent or semi-permanent attachment on the surface of a marine vessel or structure. When the device is unassembled (i.e., the stand-off block member and/or rotating elements are not attached to the base support member), the base support member is the only component of the device remaining on the surface of a structure. The base support member may be permanently or temporarily mounted to a structure or vessel with glue, screws or other similar attachment means through mounting holes 45 provided through the base support member 43, or may even be integrally formed or built into the structure. Since the base support member is preferably provided as a thin, flat and inconspicuous element, it does not disrupt every day use of the space where it is installed. Thus, embodiments such as these may be utilized in small or narrow spaces, such as along the top of a gunwale on a sailing boat or along the narrow side walks of a hull. In this and similar embodiments, the device must be assembled in order to provide the desired deterrent effect. Specifically, the base support member 43 may be provided with an associated shaft receptacle 52 or similar receiving means that receives a shaft 51 or similar structure of a rotating element 41 (or alternatively a shaft of a stand-off block member with associated rotating member attached thereto) in order to rotatably attach the rotating element to the base support member.

Figure 23A:
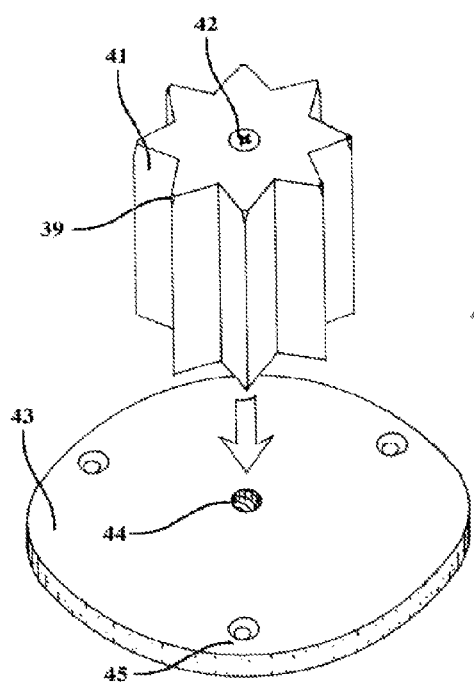
FIGS. 23(a-b) show a perspective and top view respectively of a deterrent device and method of attachment to a structure according to another alternative embodiment of the present invention.
FIG. 23(c) is a cross-sectional view taken along line 23(c)-23(c) of FIG. 23(b).
Figure 23B:
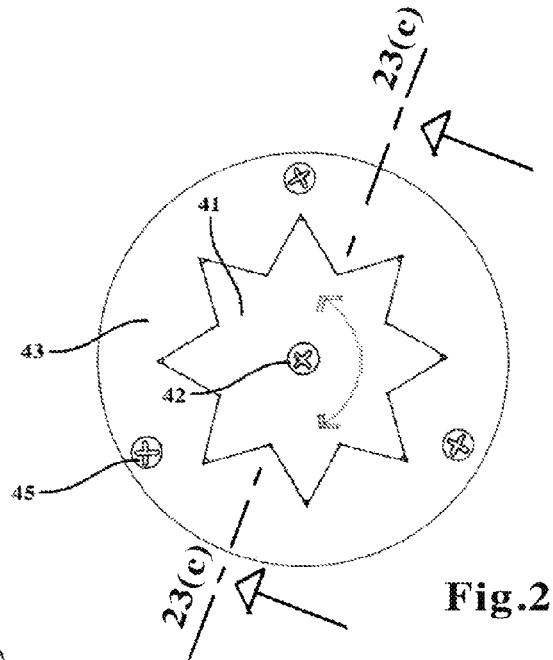
Figure 23C:
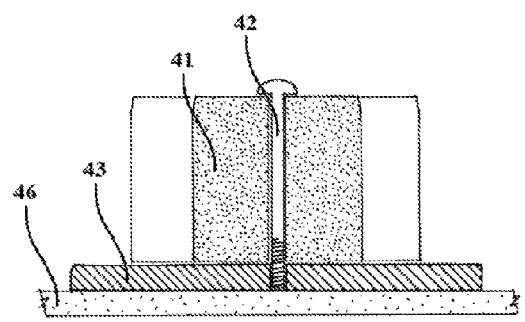

Alternatively and as shown in FIGS. 23($a$-$c$), the base support member may be provided with a threaded opening 44 or similar engagement means for receiving and engaging a screw 42, bolt, shaft or similar attachment means provided through a rotating element in order to rotatably attach the rotating element to the base support member. Furthermore, a screw or similar attachment means may be provided through a stand-off block member in order to attach a stand-off block member to the base support member with threaded opening 44. Persons of ordinary skill in the art will understand that the embodiments presented herein are just a few of the alternatives available for the present invention and that those alternative embodiments are not limited to those described herein.

Figure 24A:
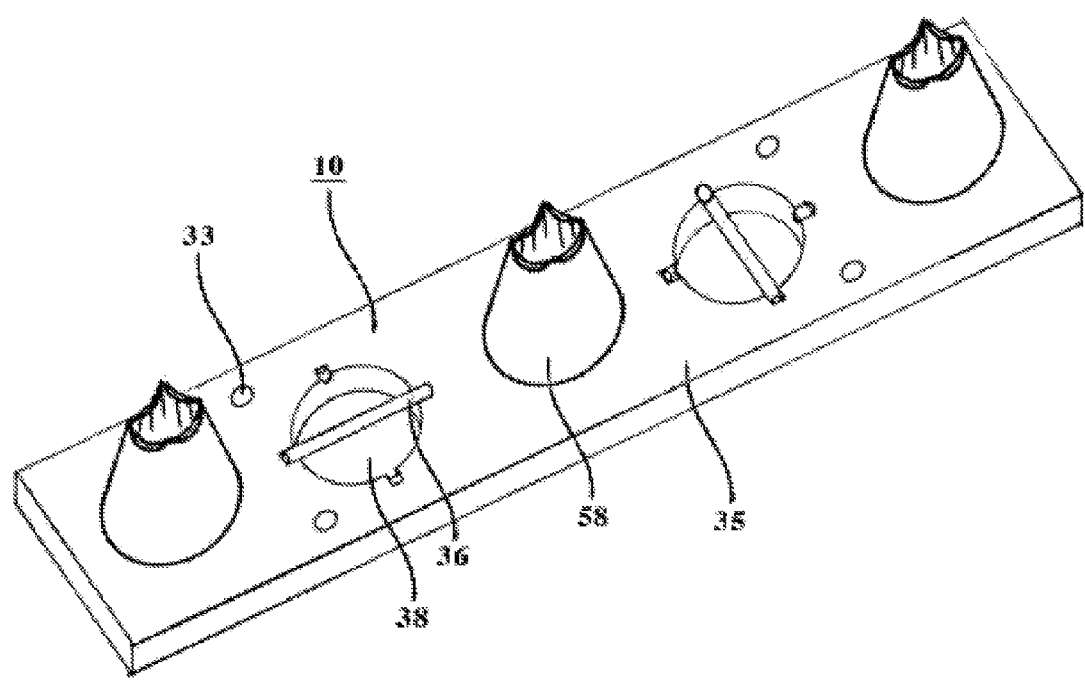
FIG. 24(a) shows a perspective view of an irritating element of a deterrent device according to yet another alternative embodiment of the present invention.
Figure 24B:
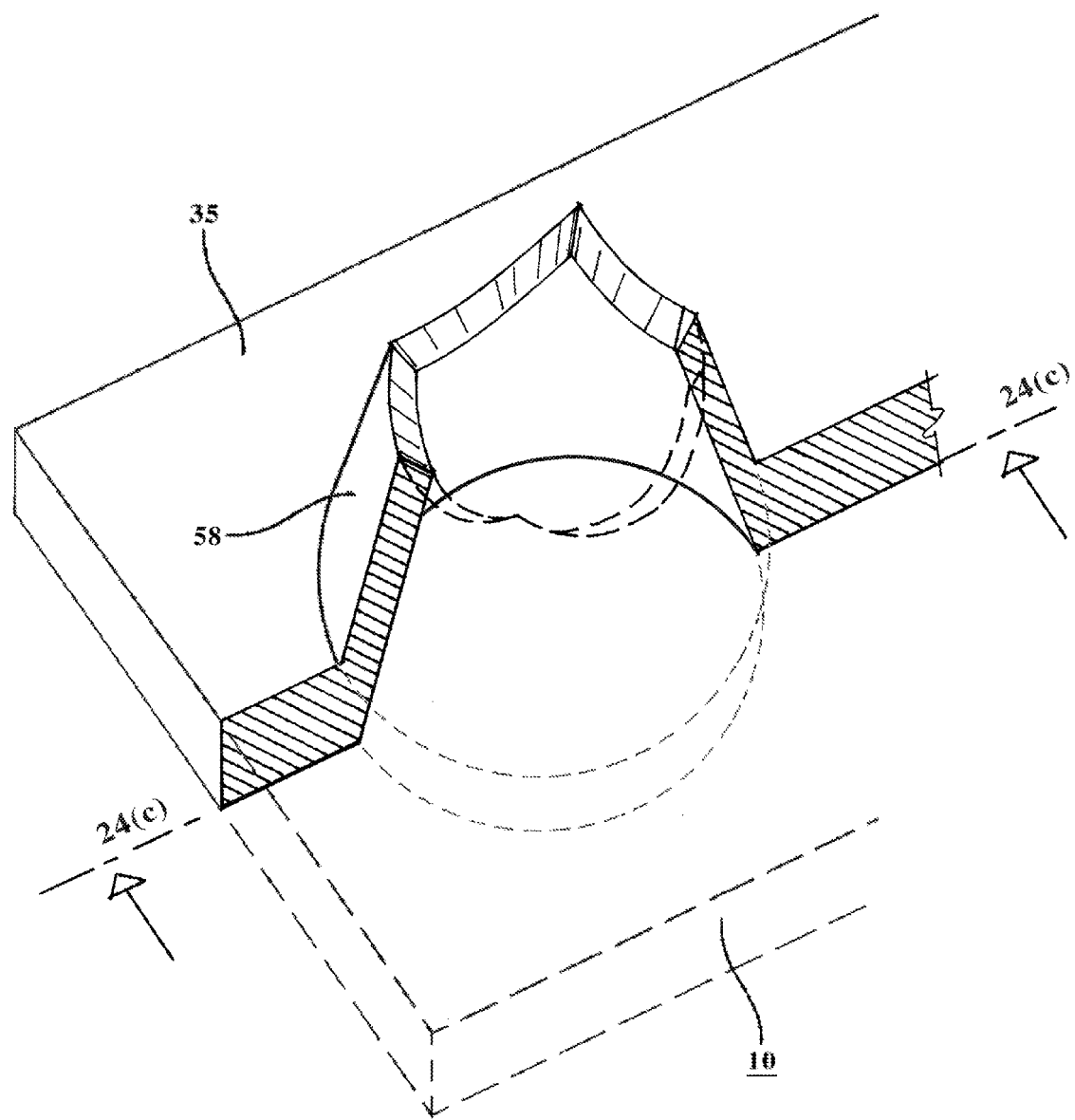
FIG. 24(*b*) shows a detailed perspective view of the deterrent device of FIG. 24(*a*). A sectioned/removed portion is shown in phantom.
Figure 24C:
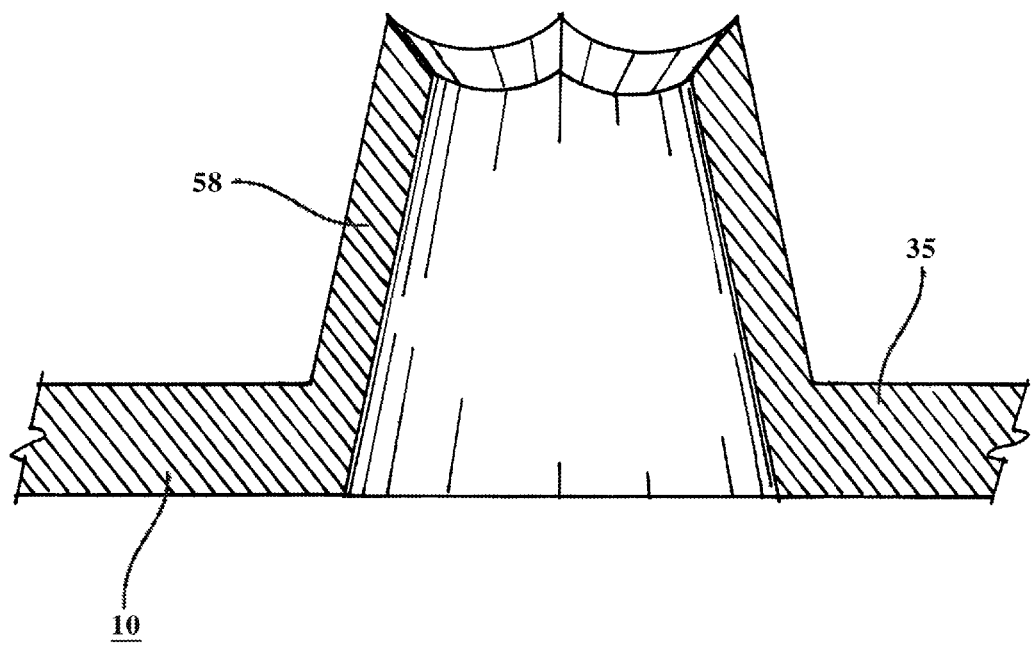

Even further, persons of ordinary skill in the art will understand that non-rotating/non-releasing irritating elements/embodiments may be utilized in certain embodiments of the invention, even though this may increase the risk of scratching or similar injury to the animals being deterred. In other words, to the degree that the sharpness of the irritating element is increased, the likelihood of injury may be increased. That possibility or increased likelihood of injury can be factored into the particular application of the invention and into related design decisions. For example, in an alternative embodiment of the present invention, the deterrent device of the present invention may be provided with a non-rotating/fixed irritating element, as shown in FIGS. 24($a$-$c$). In this embodiment, the non-rotating/fixed irritating element 58 may be integrally molded into the base support member or affixed to the base support member by any suitable attachment means (not shown). In FIGS. 24($a$-$c$), the integral non-rotating/fixed irritating element 58 is shown with a plurality of pointed spikes at the top of the irritating element, but persons of ordinary skill in the art will appreciate that the irritating element may be provided in a variety of shapes and sizes and is not limited by those discussed and/or disclosed herein. Furthermore, in this embodiment the device may be nestable and/or stackable with other similarly sized and shaped devices, and a plurality of the non-rotating/fixed elements may even be provided on a flexible base support member that is capable of being rolled up for storage.

Figure 12A:
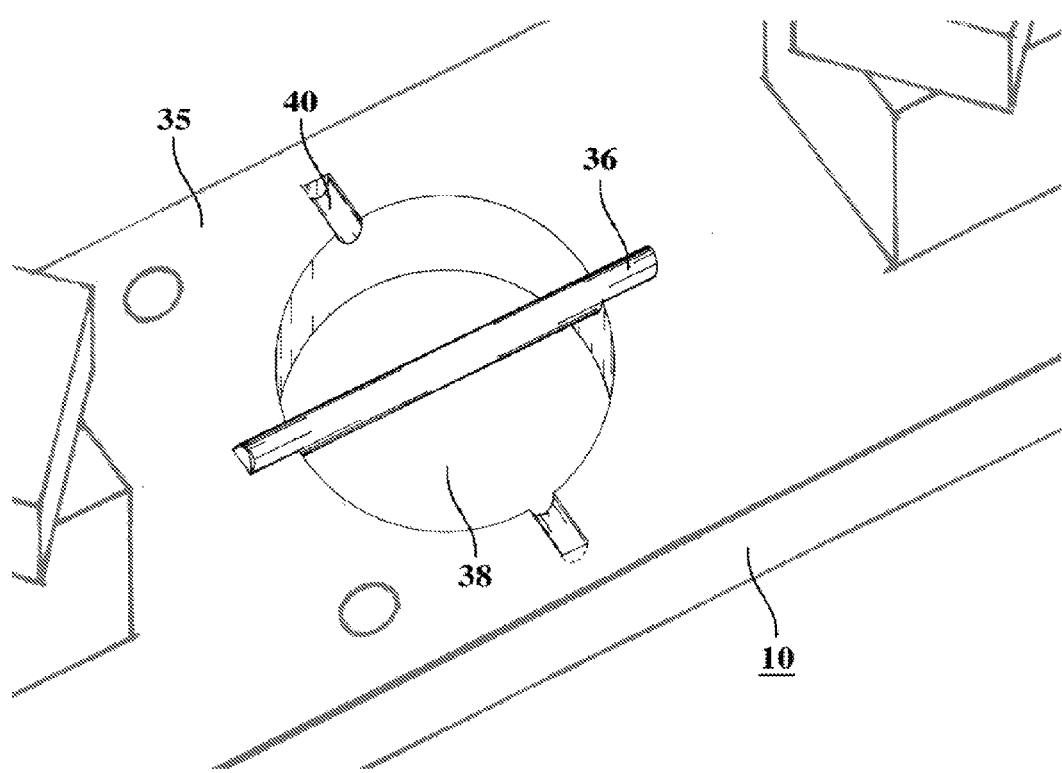
FIG. 12(a) is a detailed perspective view of a deterrent device according to a preferred embodiment of the present invention, showing a mounting bar member and notch element configured for placement of the mounting bar member.
Figure 12B:
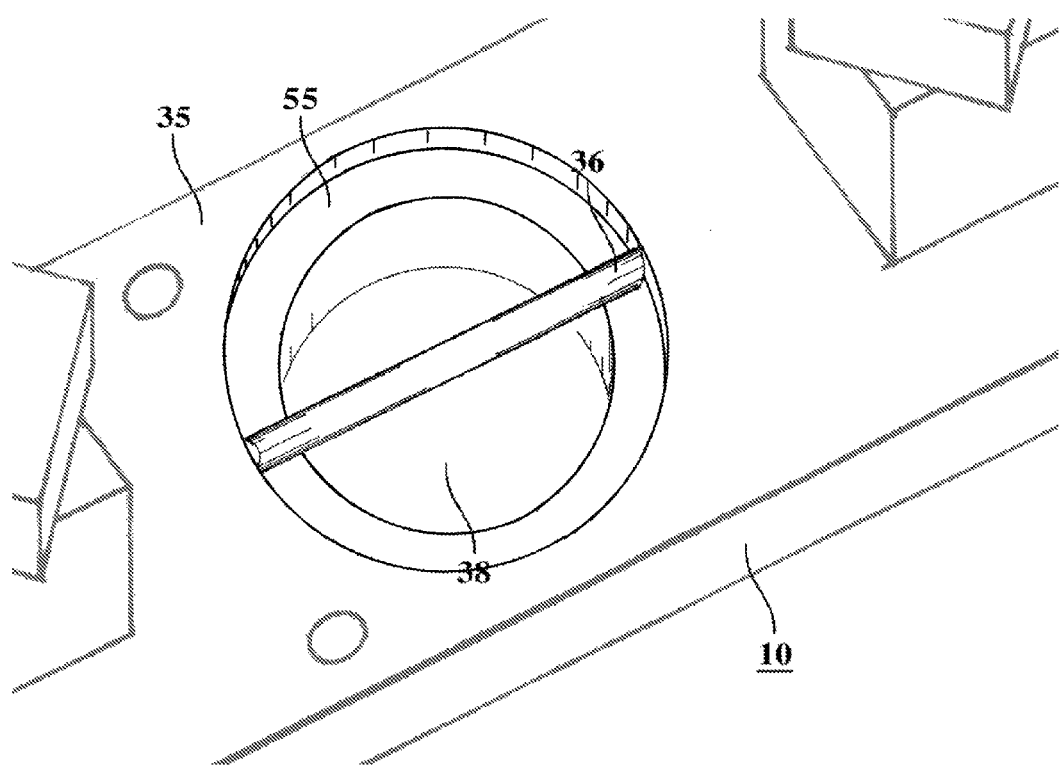
FIG. 12(b) is a detailed perspective view of a deterrent device according to one of the many alternative embodiments of the present invention, showing a mounting bar member and recessed opening configured for the cooperative placement of the mounting bar member.

According to a preferred embodiment of the present invention, the deterrent device is provided with a mounting bar 36 as shown in FIGS. 12($a$) and 12($b$). The mounting bar may be attached to the base support member of the device by any suitable means. Preferably as shown in the FIG. 12($a$), notch elements 40 are provided in the base support member of the device. The ends of the mounting bar member fit tightly (as a friction fit) into these notch elements, thus securing the mounting bar member in place on the base support member of the device. If desired, glue or adhesive may be provided in the notch elements prior to placing the mounting bar member to better secure the mounting bar member in place, or the bar members can be positioned in a desired location on the base in some other suitable manner. Alternatively as shown in FIG. 12($b$), a recessed or "countersunk" edge or ring 55 may be provided in the opening of the base support member, in order to cooperatively engage, retain, and/or support the mounting bar member in a desired position with respect to the opening.

Figure 13:
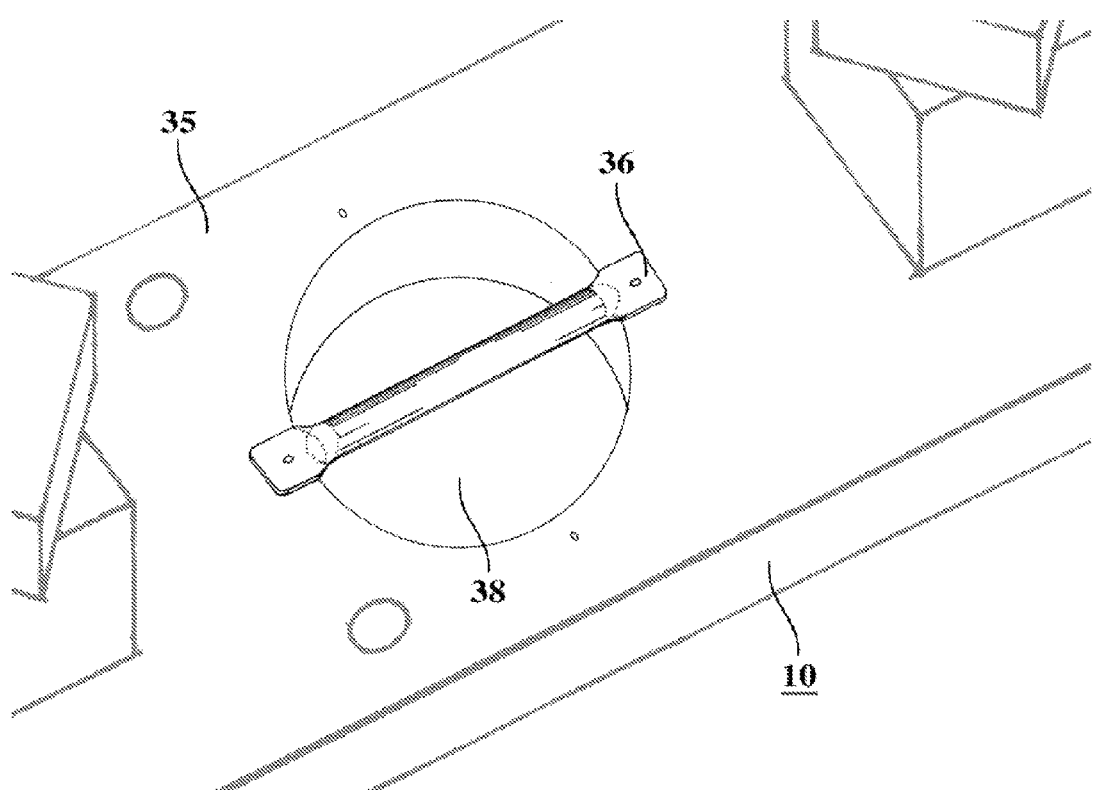
FIG. 13 is a detailed perspective view of a mounting bar of a deterrent device according to one of the many alternative embodiments of the present invention.

In one of the many alternative embodiments of the present invention, the mounting bar member may be attached to the base support member of the device with any suitable fastening means such as screws or nails. In FIG. 13, the mounting bar member is attached to the base support member of the device with screws that are driven through the ends of the mounting bar member and then through the base support member of the device. Persons of ordinary skill in the art will appreciate that the attachment method and configuration of the mounting bar may vary in alternative embodiments while still providing an effective means for temporarily or fixedly attaching the deterrent device to a structure. Further, just as the size, shape, and configuration of the opening provided in the base support member of the device may vary, the size, shape, and configuration of the mounting bar may likewise vary to fit with an alternative opening.

Figure 20:
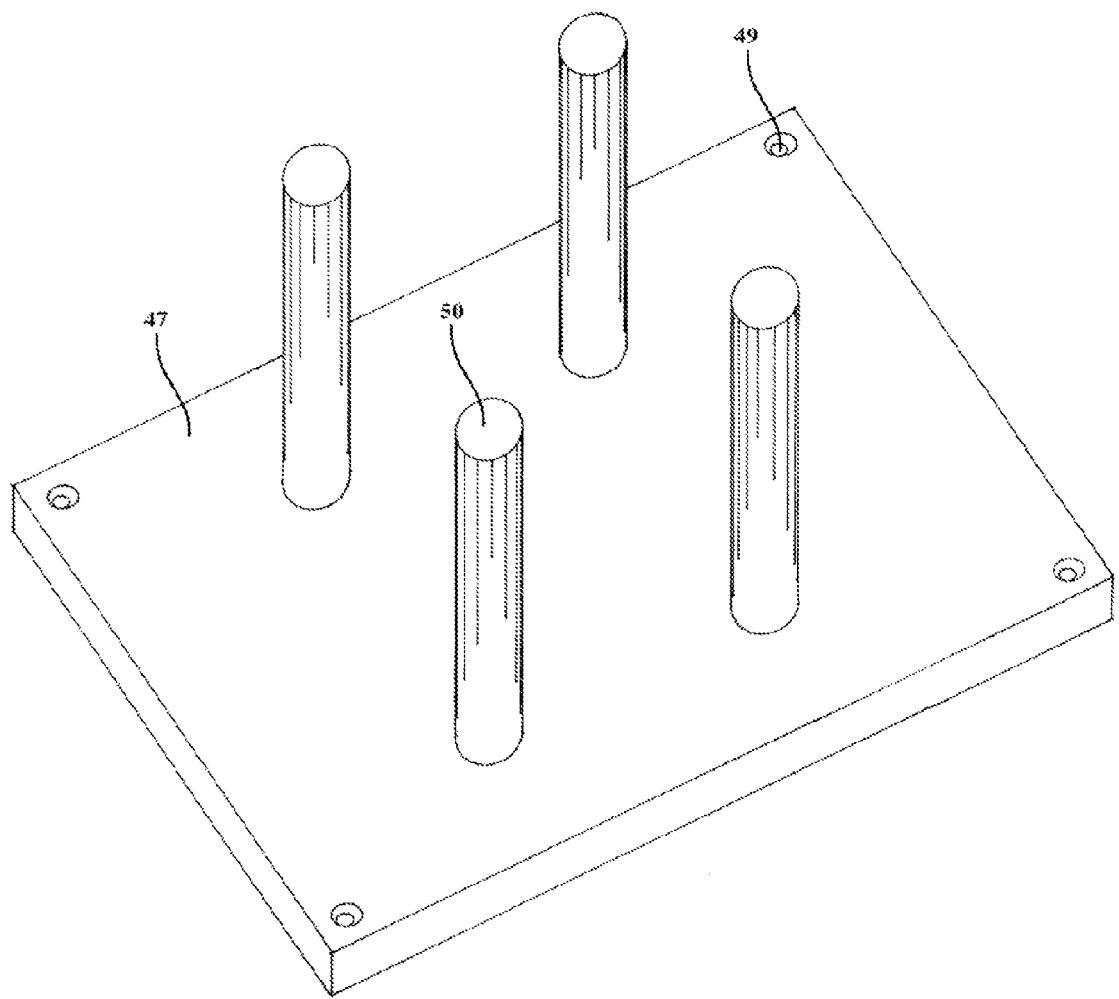
FIG. 20 is a perspective view of a storage device for storing a plurality of deterrent devices according to a preferred embodiment of the present invention.
Figure 21:
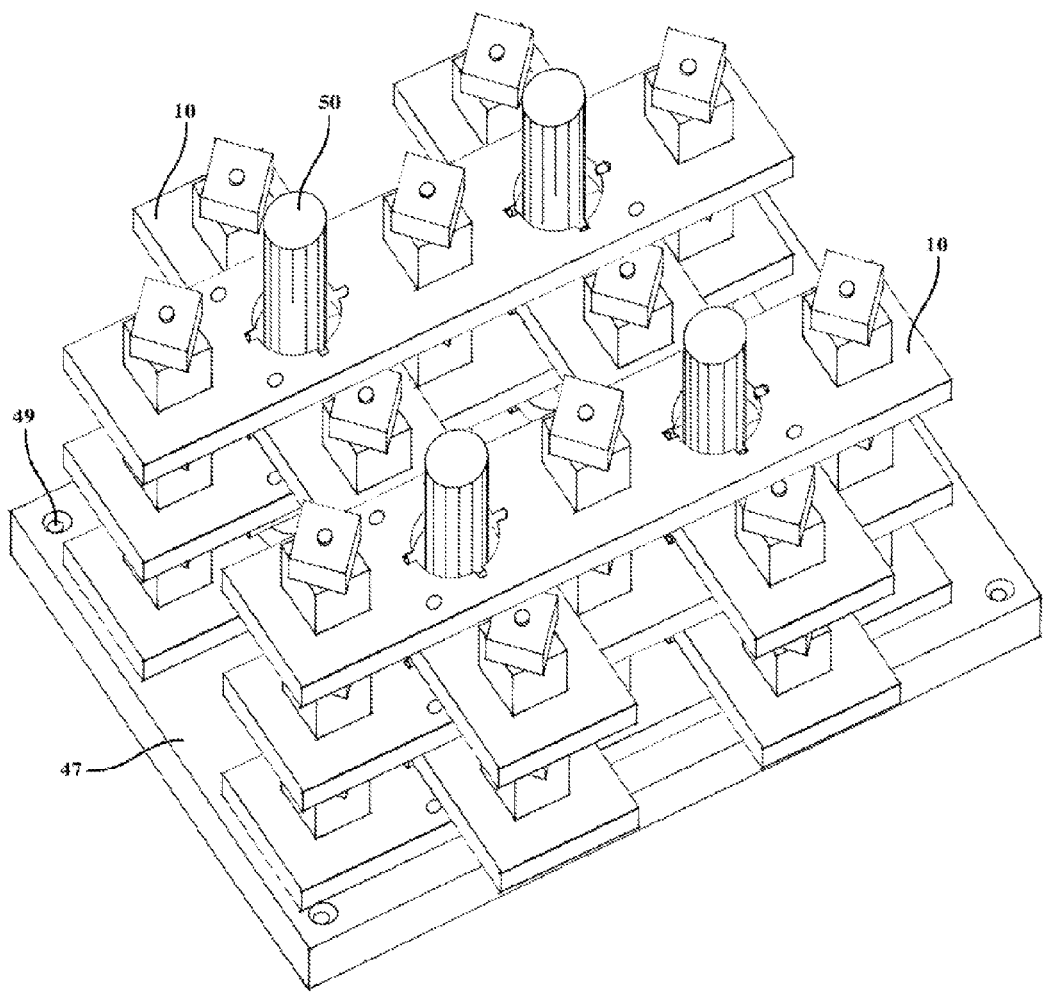
FIG. 21 is a perspective view of a storage device with plurality of deterrent devices stacked on the storage device according to a preferred embodiment of the present invention.

As described herein, the deterrent device of the present invention is preferably stackable (and may even be nestable), and/or is otherwise modular. As shown in FIG. 20, a storage device may be provided with stacking poles 50 or similar elements attached to a base 47 for stacking and storing multiple devices. The base 47 may itself be provided with mounting holes 49 for permanently or temporarily mounting the base 47 to a structure with any suitable attachment means. As further shown in FIG. 21, multiple devices may be stacked onto one storage device at one time. Specifically, the poles 50 of the storage device are provided through openings 38 in the base support members 35 of the deterrent devices in order to stack multiple devices on top of each other. Preferably, the orientation of the stacked devices at each level alternate so as to "nest" and thereby occupy less space when stacked on the storage device. Persons of ordinary skill in the art will appreciate that the size, shape and configuration of the storage device may vary depending on the size, shape and number of deterrent devices needing to be stacked. In addition, the deterrent device of the present invention preferably is capable of being stacked and/or nested with other similar devices even without a separate storage device, and the storage device is or can be provided as added feature to assist a user in stacking/storing various devices.

As described herein, the present deterrent device is irritating and uncomfortable for pinnipeds and other marine-dwelling animals to haul out, climb on, walk or lay down on, thus deterring them from getting onto structures where the device is installed. The present invention provides many advantages over prior art deterrent devices known in the art. Among other things, the deterrent device is easily installed, removed, and stored with little or no damage to the structure where it is installed. Further, as described herein the present deterrent device does not occupy a lot of space while in use or when in storage. Among other things, the device is stackable (and may even be nestable) and is therefore capable of being stored in very small spaces. In addition, while in use, the device preferably does not preclude the normal use of an area where it is installed (by way of example, the invention can be provided as a series of relatively low, small, modular, spaced units). Furthermore, the present deterrent device preferably does not harm any animals or the surrounding environment, does not consume or waste any energy, does not require any significant maintenance, and does not present any significant aesthetic or acoustic pollution to the surrounding environment.

Figure 25A:
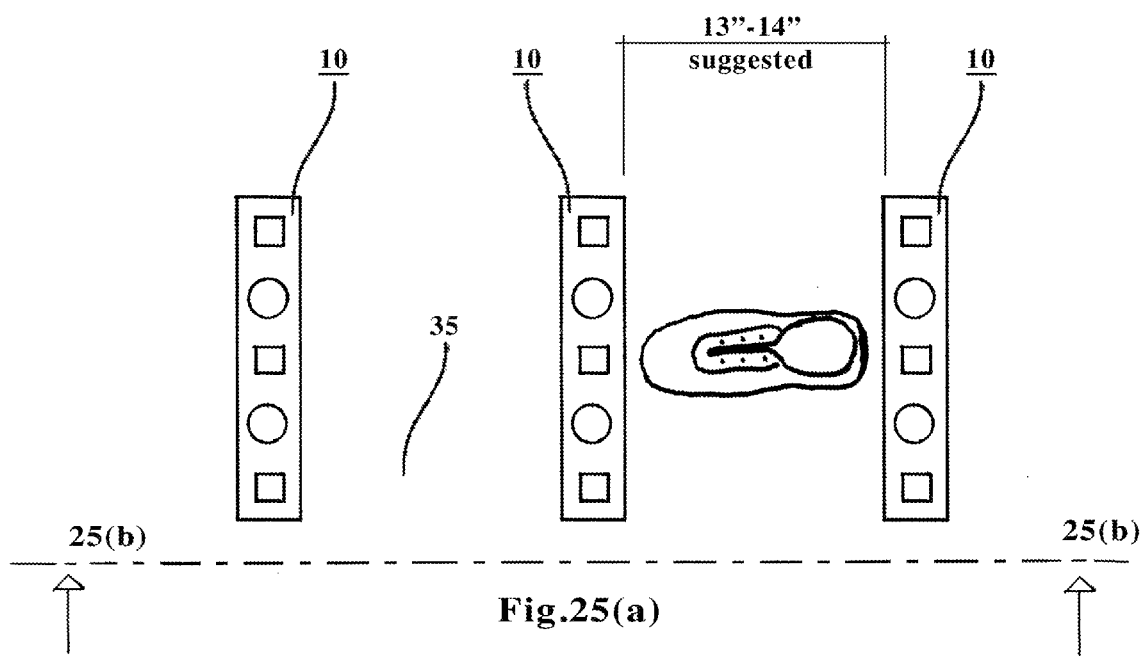
FIG. 25(*a*) shows a top view of a preferred arrangement of deterrent devices according to one embodiment of the present invention.
Figure 25B:
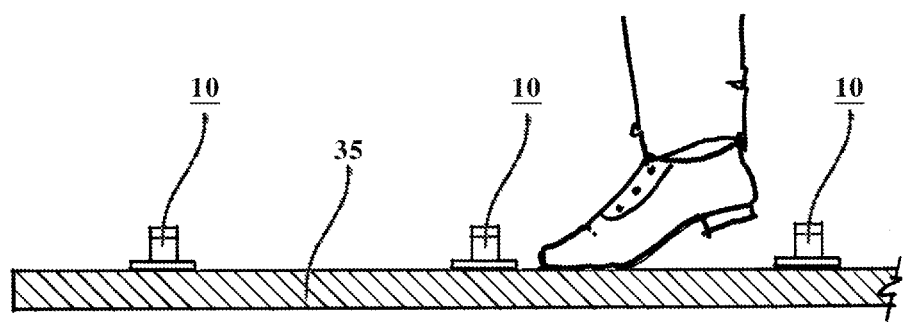

Even further, some of the many alternative embodiments of the invention may be so "modular" such that every element/member of the device is provided as a single, separate unit, and those units (and/or assemblies of units) can be mixed/matched/selected from a wide variety of sizes, shapes, colors, etc. The advantages of this are numerous: first, consumers of the device are provided with the option to mix and match different sized, shaped, and colored elements and they are not limited to only one configuration of the device. In addition, consumers may customize the size and configuration of the device based on the size and configuration of the space they want to protect. Also, if certain elements experience more wear and tear than others and need replacing, consumers do not have to purchase an entirely new device, but can purchase/replace only those elements that need replacing. Further, the device does not occupy a lot of space or preclude the use by humans of a space where it is installed, since its modular units can be spaced from each other in any desired arrangement and preferably are sufficiently low enough to allow people to easily walk over them and/or otherwise through the area. Persons of ordinary skill in the art will understand that the "height" of any particular embodiment can take into account that factor (the potential for human traffic through the area while installed), to balance the effectiveness of the deterrent with the desire to not inadvertently cause humans to trip over the device. As shown in FIGS. 25(*a-b*), in a preferred embodiment, the units are preferably spaced approximately 13"-14" from each other in order to allow room in between the units for an average sized foot to step. Persons of ordinary skill in the art, however, will appreciate that the units may be spaced from each other more or less, or even not spaced at all (i.e., units abutting each other), and that they may be placed in any configuration or combination of configurations while still enjoying the benefits provided by the present invention.

The apparatus and methods of the present invention have been described with some particularity, but the specific designs, constructions, and steps disclosed are not to be taken as delimiting of the invention. Additional embodiments and other modifications will make themselves apparent to those of ordinary skill in the art, all of which will not depart from the essence of the invention and all such changes and modifications are intended to be encompassed within the appended claims.

What is claimed is:

1. An apparatus for deterring a large sea mammal, the apparatus comprising:
   an elongated base element having a top surface, the base element including an attachment means for attaching the base element to a structure;
   a plurality of stand-off members coupled to the top surface of the base element;
   a plurality of axle members, each axle member coupled to the base element through a respective stand-off member, and each axle member extending perpendicularly with respect to the top surface of the base element; and
   a plurality of irritating elements rotatably coupled to the plurality of stand-off members via the plurality of axle members, each irritating element rotatably coupled to a respective stand-off member via a respective axle member,
   wherein:
     at least one irritating element of the plurality of irritating elements has a first cross-section a first distance from the top surface of the base element, and a second cross-section a second distance, different from the first distance, from the top surface of the base element, the first cross-section and the second cross-section being parallel to the top surface of the base element,
     a first number of corners in the first cross-section is different from a second number of corners in the second cross-section, and
     at least the first cross-section comprises a shape having a plurality of concave sides.

2. The apparatus of claim 1, wherein:
   the base element has a first dimension along a first direction and a second dimension along a second direction, the second dimension larger than the first dimension, and
   the plurality of stand-off members are spaced apart on the base element along the second direction of the base element.

3. The apparatus of claim 1, wherein:
   each of the plurality of irritating elements has the same shape.

4. The apparatus of claim 1, wherein:
   a first of the plurality of irritating elements has a first shape, and a second of the plurality of irritating elements has a second shape, different from the first shape.

5. The apparatus of claim 1, wherein the attachment means comprises at least one screw or bolt provided through an opening in the base element.

6. The apparatus of claim 1, wherein the attachment means comprises an adhesive.

7. The apparatus of claim 1, wherein the plurality of stand-off members are configured to space the plurality of irritating elements from the top surface of the base element.

8. The apparatus of claim 1, wherein the plurality of axle members are fixedly inserted at one end through the stand-off members, and rotatably inserted at an opposite end through openings in the irritating elements.

9. The apparatus of claim 1, wherein at least one irritating element is angled with respect to the top surface of the base element.

10. The apparatus of claim 1, wherein the second cross-section comprises a plurality of non-contiguous shapes.

11. The apparatus of claim 1, wherein the second number of corners in the second cross-section equals a sum of corners of each of a plurality of non-contiguous shapes in the second cross-section, and the first number of corners in the first cross-section equals a number of corners in a shape in the first cross-section.

12. The apparatus of claim 1, wherein the second distance is greater than the first distance.

13. The apparatus of claim 1, wherein a shape of the first cross-section is different from a shape of the second cross-section.

14. The apparatus of claim 1, wherein at least the first cross-section comprises a non-continuous concave form.

15. The apparatus of claim 1, wherein the attachment means comprises a plurality of mounting slots or notches provided in the base element.

16. The apparatus of claim 15, wherein the attachment means further comprises a strap element, the strap element capable of being secured to the structure and configured and positioned with respect to the mounting slots or notches in the base element to hold the irritating elements in a particular relationship with respect to the structure.

17. The apparatus of claim 1, wherein the attachment means comprises a mounting bar member associated with the base element.

18. The apparatus of claim 17, wherein the attachment means further comprises an opening in the base element, and the mounting bar member is provided across the opening, and the opening is configured to facilitate engagement between the mounting bar member and the structure.

19. The apparatus of claim 18, wherein the attachment means further comprises a strap element, the strap element capable of being secured to the structure and configured and positioned with respect to the opening in the base element and the mounting bar member to hold the irritating elements in a particular relationship with respect to the structure.

20. The apparatus of claim 18, wherein the attachment means further includes a clip element, the clip element including a first engagement element engagable with the mounting bar member and a second engagement element engagable with the structure.

21. A method for manufacturing an apparatus for deterring a large sea mammal, the method comprising:
  forming an elongated base element having a top surface, the base element including an attachment means for attaching the base element to a structure;
  forming a plurality of stand-off members coupled to the top surface of the base element;
  forming a plurality of axle members, each axle member coupled to the base element through a respective stand-off member, and each axle member extending perpendicularly with respect to the top surface of the base element; and
  forming a plurality of irritating elements rotatably coupled to the plurality of stand-off members via the plurality of axle members, each irritating element rotatably coupled to a respective stand-off member via a respective axle member,
  wherein:
    at least one irritating element of the plurality of irritating elements has a first cross-section a first distance from the top surface of the base element, and a second cross-section a second distance, different from the first distance, from the top surface of the base element, the first cross-section and the second cross-section being parallel to the top surface of the base element,
    a first number of corners in the first cross-section is different from a second number of corners in the second cross-section, and
    at least the first cross-section comprises a shape having a plurality of concave sides.

* * * * *